United States Patent
Lewbel

(10) Patent No.: US 11,526,322 B2
(45) Date of Patent: Dec. 13, 2022

(54) ENHANCED TECHNIQUES FOR MERGING CONTENT FROM SEPARATE COMPUTING DEVICES

(71) Applicant: MICROSOFT TECHNOLOGY LICENSING, LLC, Redmond, WA (US)

(72) Inventor: Hannah Rebecca Lewbel, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 227 days.

(21) Appl. No.: 16/112,687

(22) Filed: Aug. 25, 2018

(65) Prior Publication Data
US 2020/0065052 A1 Feb. 27, 2020

(51) Int. Cl.
*G06F 3/14* (2006.01)
*G06F 3/01* (2006.01)
(Continued)

(52) U.S. Cl.
CPC ............ *G06F 3/1454* (2013.01); *G06F 3/017* (2013.01); *G06F 3/04845* (2013.01);
(Continued)

(58) Field of Classification Search
CPC ..... H04N 1/0035; G06F 9/543; G06F 3/1454; G06F 3/017; G06F 3/04845;
(Continued)

(56) References Cited

U.S. PATENT DOCUMENTS 5,347,295 A * 9/1994 Agulnick ............... G06F 1/1626
345/156
5,777,614 A * 7/1998 Ando .................... G06F 3/0481
715/729
(Continued)

FOREIGN PATENT DOCUMENTS

CN 104731321 A 6/2015

OTHER PUBLICATIONS

"Kopy—Apps on Google Play", Retrieved From: https://play.google.com/store/apps/details?id=com.gokopy.android&hl=en, Retrieved on: Sep. 6, 2019, 3 Pages.
(Continued)

*Primary Examiner* — Jennifer N Welch
*Assistant Examiner* — KC Chen
(74) *Attorney, Agent, or Firm* — Scott Y. Shigeta; Newport IP, LLC

(57) ABSTRACT

The present disclosure provides technologies that enable users to graphically merge content displayed on a first computing device with content displayed on a second computing device by the use of a simplified gesture. For example, a user can hold a portable computer displaying content up to a screen of another computer displaying other content. The user can position the portable computer to align the rendering of the content with a rendering of the other content. Measurements of the alignment are processed to determine a location that is used to graphically merge the content of the portable computer at a specific location within the other content. A scaling factor can be used to control the size of the content that is placed within the other content. The scaling factor can be based on a user gesture, preference data, or knowledge of a computing device.

20 Claims, 28 Drawing Sheets

(51) Int. Cl.
*G06F 3/04845* (2022.01)
*G06F 3/04883* (2022.01)
*G06F 3/16* (2006.01)
*G09G 5/373* (2006.01)
*G09G 5/38* (2006.01)

(52) U.S. Cl.
CPC .......... *G06F 3/04883* (2013.01); *G06F 3/167* (2013.01); *G09G 5/373* (2013.01); *G09G 5/38* (2013.01); *G09G 2340/10* (2013.01); *G09G 2354/00* (2013.01); *G09G 2356/00* (2013.01)

(58) Field of Classification Search
CPC .... G06F 3/04883; G06F 3/167; G06F 40/174; G06F 40/169; G09G 5/373; G09G 5/38; G09G 2340/10; G09G 2354/00; G09G 2356/00; G06K 9/6267
See application file for complete search history.

(56) References Cited

U.S. PATENT DOCUMENTS

| | | | | |
|---|---|---|---|---|
| 5,848,158 | A * | 12/1998 | Saito | G11B 20/00086 705/54 |
| 7,062,532 | B1 * | 6/2006 | Sweat | G06Q 10/06 709/205 |
| 7,877,445 | B2 * | 1/2011 | Komine | G06Q 10/10 709/205 |
| 8,077,157 | B2 | 12/2011 | Sengupta et al. | |
| 8,380,225 | B2 | 2/2013 | Cheng et al. | |
| 9,443,441 | B1 * | 9/2016 | Scott | G09B 5/00 |
| 9,699,152 | B2 | 7/2017 | Krishna | |
| 2004/0078757 | A1 * | 4/2004 | Golovchinsky | G06F 17/241 715/205 |
| 2006/0146765 | A1 * | 7/2006 | Van De Sluis | G06F 3/016 370/338 |
| 2006/0256074 | A1 | 11/2006 | Krum et al. | |
| 2007/0015534 | A1 * | 1/2007 | Shimizu | G06F 3/04892 455/550.1 |
| 2007/0143082 | A1 * | 6/2007 | Degnan | G06T 11/60 703/1 |
| 2007/0200922 | A1 | 8/2007 | Ueno et al. | |
| 2008/0072180 | A1 * | 3/2008 | Chevalier | G06F 3/0481 715/861 |
| 2009/0309808 | A1 * | 12/2009 | Swingler | G06F 3/1423 345/1.3 |
| 2011/0081923 | A1 | 4/2011 | Forutanpour et al. | |
| 2011/0088002 | A1 | 4/2011 | Freer | |
| 2012/0040720 | A1 * | 2/2012 | Zhang | H04M 1/7253 455/557 |
| 2012/0324372 | A1 | 12/2012 | Kowalkiewicz et al. | |
| 2013/0021323 | A1 * | 1/2013 | Chang | G06F 3/0325 345/419 |
| 2014/0053086 | A1 * | 2/2014 | Kim | H04L 65/403 715/753 |
| 2014/0282090 | A1 | 9/2014 | Waxman et al. | |
| 2014/0282177 | A1 * | 9/2014 | Wang | G06F 3/0481 715/771 |
| 2014/0292720 | A1 | 10/2014 | Liang | |
| 2015/0042538 | A1 * | 2/2015 | Locker | G06F 3/0488 345/1.3 |
| 2015/0243288 | A1 * | 8/2015 | Katsuranis | G06F 3/0484 704/275 |
| 2015/0332620 | A1 * | 11/2015 | Sako | G09G 3/003 345/8 |
| 2016/0196099 | A1 * | 7/2016 | Ryden | G06F 9/4856 345/2.2 |
| 2017/0046037 | A1 | 2/2017 | Dand | |
| 2017/0048488 | A1 * | 2/2017 | Novak | G06F 3/017 |
| 2018/0077248 | A1 | 3/2018 | Srour et al. | |
| 2018/0197428 | A1 * | 7/2018 | Baphna | G09B 5/00 |
| 2019/0222540 | A1 * | 7/2019 | Relangi | G06F 3/0481 |

OTHER PUBLICATIONS

"Pasteasy 2.1.6 Free Download", Retrieved From: https://pasteasy-ios.soft112.com/. Retrieved on: Jun. 28, 2014, 6 Pages.
Allison, Michael, "How to configure Microsoft's new Windows 10 Cloud Clipboard—MSPoweruser", Retrieved From: https://mspoweruser.com/how-to-configure-microsofts-new-windows-10-cloud-clipboard/, Jun. 27, 2018, 16 Pages.
"International Search Report and Written Opinion Issued in PCT Application No. PCT/US2019/038832", dated Nov. 20, 2019, 18 Pages.

* cited by examiner

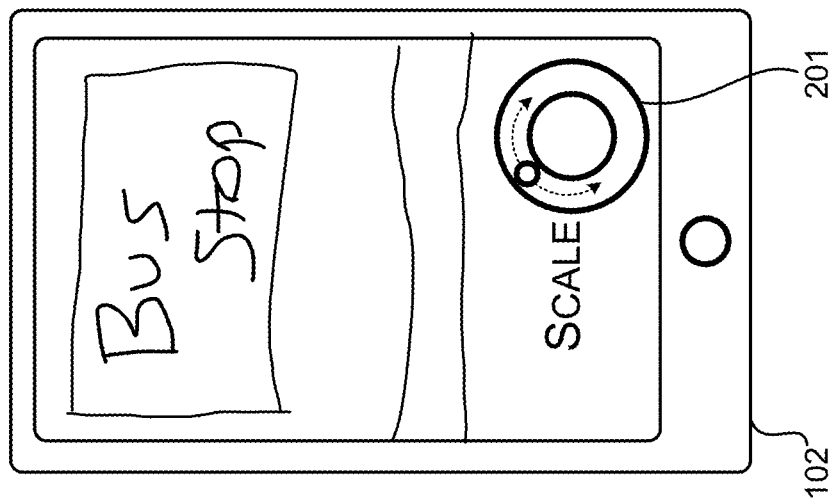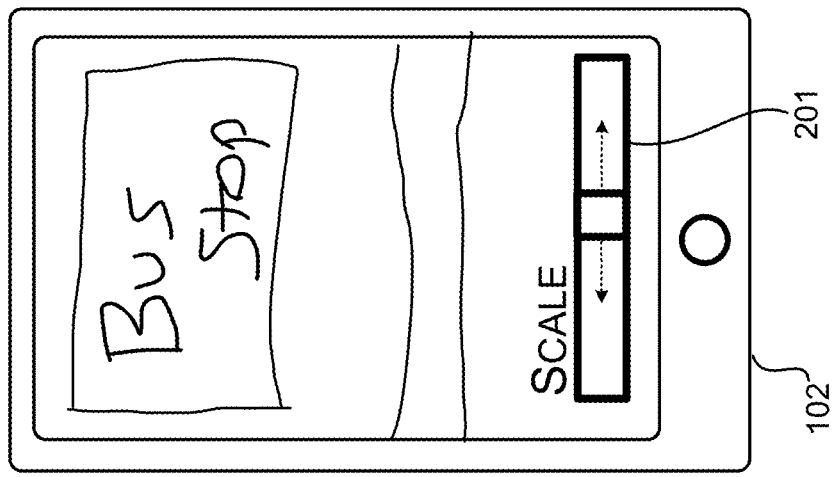
FIGURE 2B

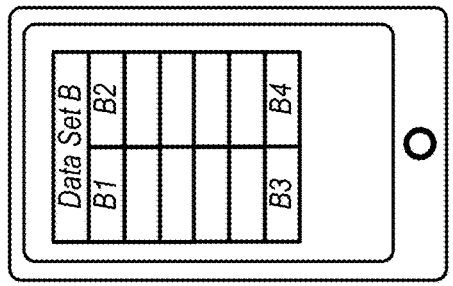
SECOND COMPUTER 102 WITH ENVIRONMENT FOR EDITING THE CONTENTS OF A 2ND FILE
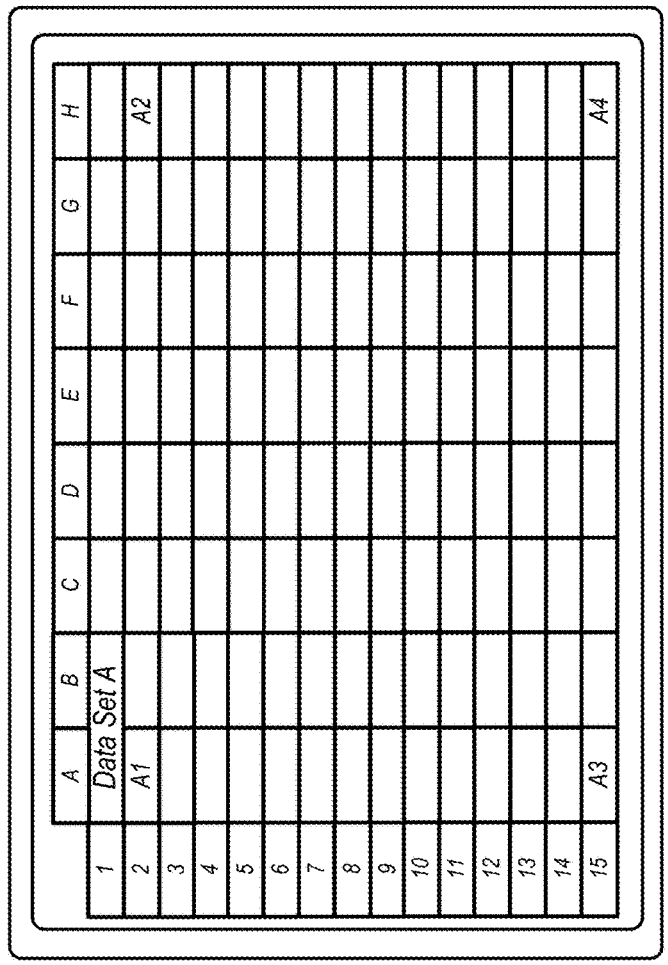
FIRST COMPUTER 101 WITH ENVIRONMENT FOR EDITING THE CONTENTS OF A FIRST FILE
*FIGURE 3A*

ENHANCED TECHNIQUES FOR MERGING CONTENT FROM SEPARATE COMPUTING DEVICES

BACKGROUND

There are a number of software applications that allow multiple users to edit files. For instance, the OFFICE 365 productivity suite, the GOOGLE DOCS online word processor, and other server-based systems enable multiple users to provide input to add text, drawing elements, and other data to a shared file. Although these systems are useful for most multi-user scenarios, some existing systems still present a number of drawbacks. For instance, when a user is operating a standalone computing device and is editing a file in an independent editing session (e.g. a non-server-based word processor or whiteboard application), that user must take a number of steps in order to subsequently merge the contents of their independently edited file with the contents of a file in a multi-user editing session.

In some cases, the user must select and copy the content using one application, and then manually paste the selected content into a separate application. In this case, the user is required to use multiple applications as well as perform a number of tedious operations to accurately place the selected content at a desired location. In some scenarios, the transfer of content from one file on a first computer to another file on a second computer is not always facilitated in the most optimal way. A computer-to-computer transfer may involve a number of additional steps, such as emailing a file, before content can be finally merged with other content. In addition to a number of productivity inefficiencies, this complex process can lead to a number of inefficiencies with respect to computing resources.

SUMMARY

The technologies disclosed herein enable users to graphically merge content displayed on a first computing device with other content displayed on a second computing device by the use of a simplified gesture. For example, a user can hold a portable computer displaying content up to a screen of another computer displaying other content. The user can position the portable computer to align the rendering of its content with a rendering of the other content. Data defining measurements of the alignment are received from one or more sensors and processed to determine a location that is used to graphically merge the content of the portable computer at a specific location within the other content. A scaling factor can be used to control the size of the content that is placed within the other content. As will be described in more detail below, the scaling factor can be determined by one or more factors, such as one or more gestures performed by a user, preference data, or knowledge of either device such as a screen size, model, etc.

The techniques disclosed herein can improve user interaction with one or more computing devices. In one example, the techniques disclosed herein enable a scenario where users can participate in breakout sessions and later come together in a larger group to combine content from each person's device. By the use of simplified input gestures, content can be merged from multiple mobile computing devices to create aggregated or graphically stitched content that can be stored in a single file and displayed on a single display screen of a computer.

Among other technical benefits, the technologies disclosed herein can improve a user's interaction with one or more computing devices. For example, using the disclosed technologies a user can interact with only a single application to view and share data with another application executing on a remote computer. This can reduce the utilization of computing resources like processor cycles, memory, network bandwidth, and power.

Improved user interaction can also reduce the likelihood of inadvertent user inputs and thus save computing resources, such as memory resources, processing resources, and networking resources. The reduction of inadvertent inputs can reduce a user's time interacting with a computer, reduce the need for redundant entries of content, redundant entries for selecting content, redundant entries for pasting and transferring data. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2B shows two screenshots of example user interfaces that can be used for determining a scaling factor for displaying content.

FIG. 3A shows a scenario where the techniques disclosed herein are used for merging spreadsheet data.

DETAILED DESCRIPTION

This Detailed Description discloses aspects of a system that enables a user to graphically merge content displayed on a first computing device with content displayed on a second computing device by the use of a simplified gesture. FIG. 1A through FIG. 1F illustrate a scenario where a simplified gesture is used to merge, e.g., graphically stitch, locally-edited content of a second (small-screen) computer with other content of a first (large-screen) computer.

Figure 1A:
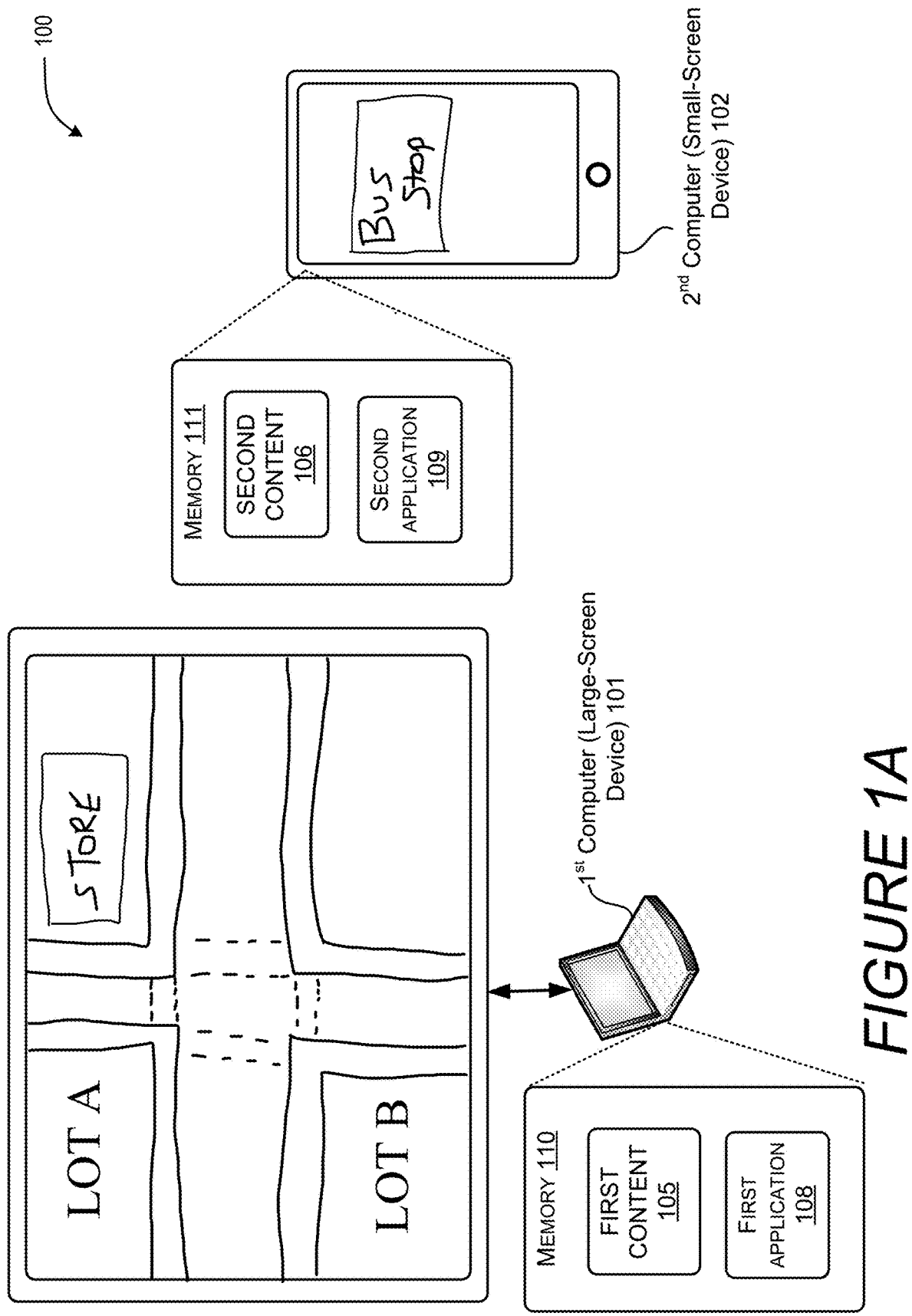
FIG. 1A is a block diagram of a system for enabling enhanced techniques for merging content from separate computing devices.

FIG. 1A shows a system 100 including a first computer 101 and a second computer 102. The first computer 101 is operating in association with a first memory 110 including a first application 108 providing an environment for editing content of a first file ("first content 105"). The first computer 101 can be in communication with a large-screen device, such as a liquid crystal display ("LCD") monitor, a projection monitor, etc. The second computer 102 is operating in association with a second memory 111 including a second application 109 providing an environment for editing content of a second file ("second content 106"). In some configurations, the second computer 102 can be in the form of a mobile device such as a phone, tablet, or any other device of a suitable size.

To illustrate features of the system 100, the first content 105 and the second content 106 include graphical elements of a whiteboard canvas. The first content 105 includes computer-generated and hand-drawn graphical elements of a map, showing features of roads, sidewalks, building structures, etc. Although this example includes graphical elements of a whiteboard canvas, this example is provided for illustrative purposes and is not to be construed as limiting. As will be described in more detail below, the techniques disclosed herein can apply to many types of content having any suitable format including, but not limited to, spreadsheet data, word processing data, computer-aided design ("CAD") data, raw image data, etc.

Figure 1B:
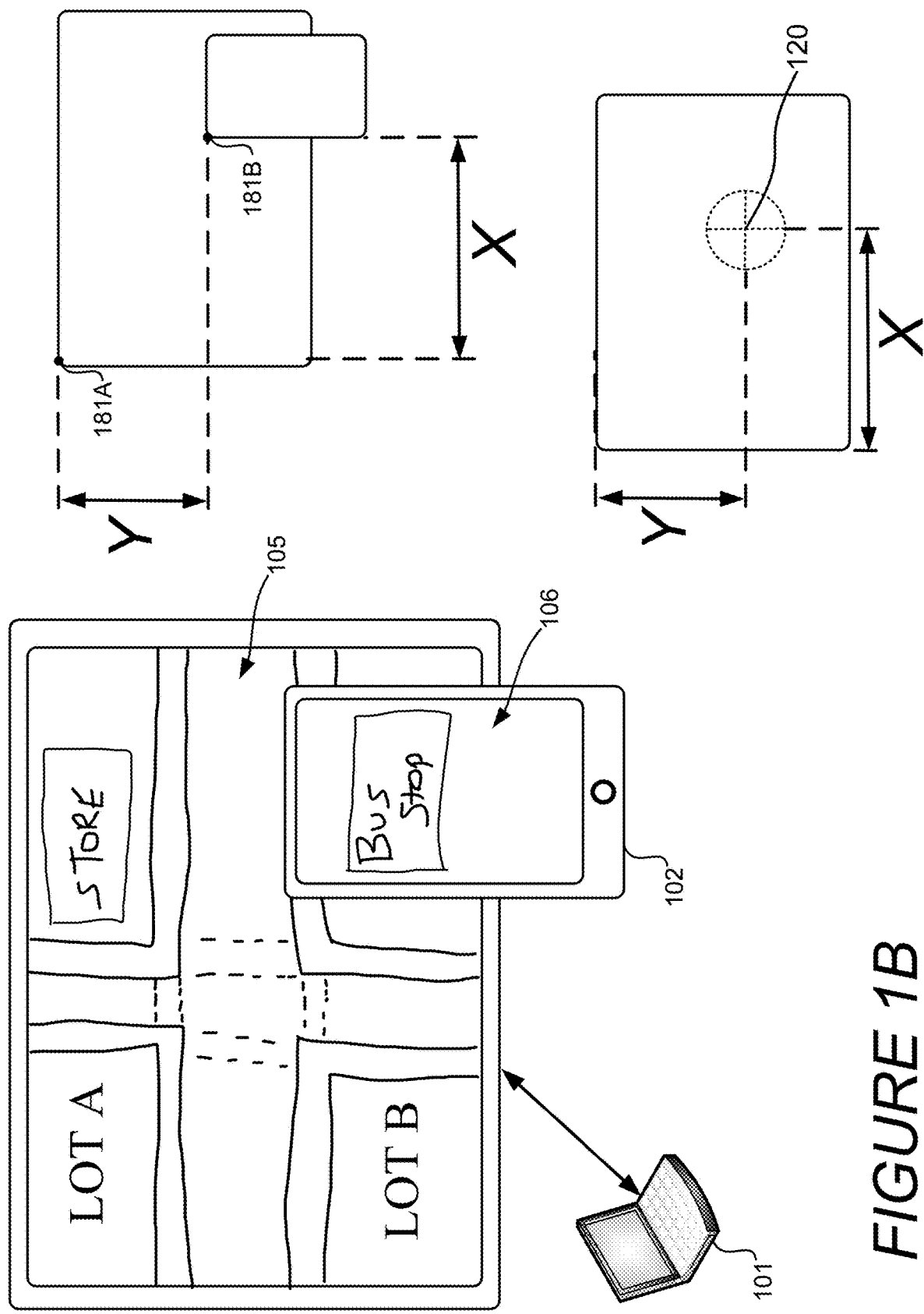
FIG. 1B shows how the computing devices of the system can be positioned to determine an anchor point for merging content.

As shown in FIG. 1B, to place the second content 106 within the first content 105, a user can align a rendering of the second content 106 with a rendering of the first content 105 to determine an anchor point 120 that is used to place the second content 106 within the first content 105. The anchor point 120 can be determined based on the position of the rendering of the second content of the second computer 102 relative to the position of a display of the rendering of the first content 105. As shown, one or more coordinates (i.e. X and Y) define an offset between two reference points 181 within the first content 105 and the second content 106. For instance, coordinates defining an offset may be used to measure a distance between a first reference point 181A in the upper-left corner of the first content 105 relative to a second reference point 181B in the upper-left corner of the second content 106.

Figure 1C:
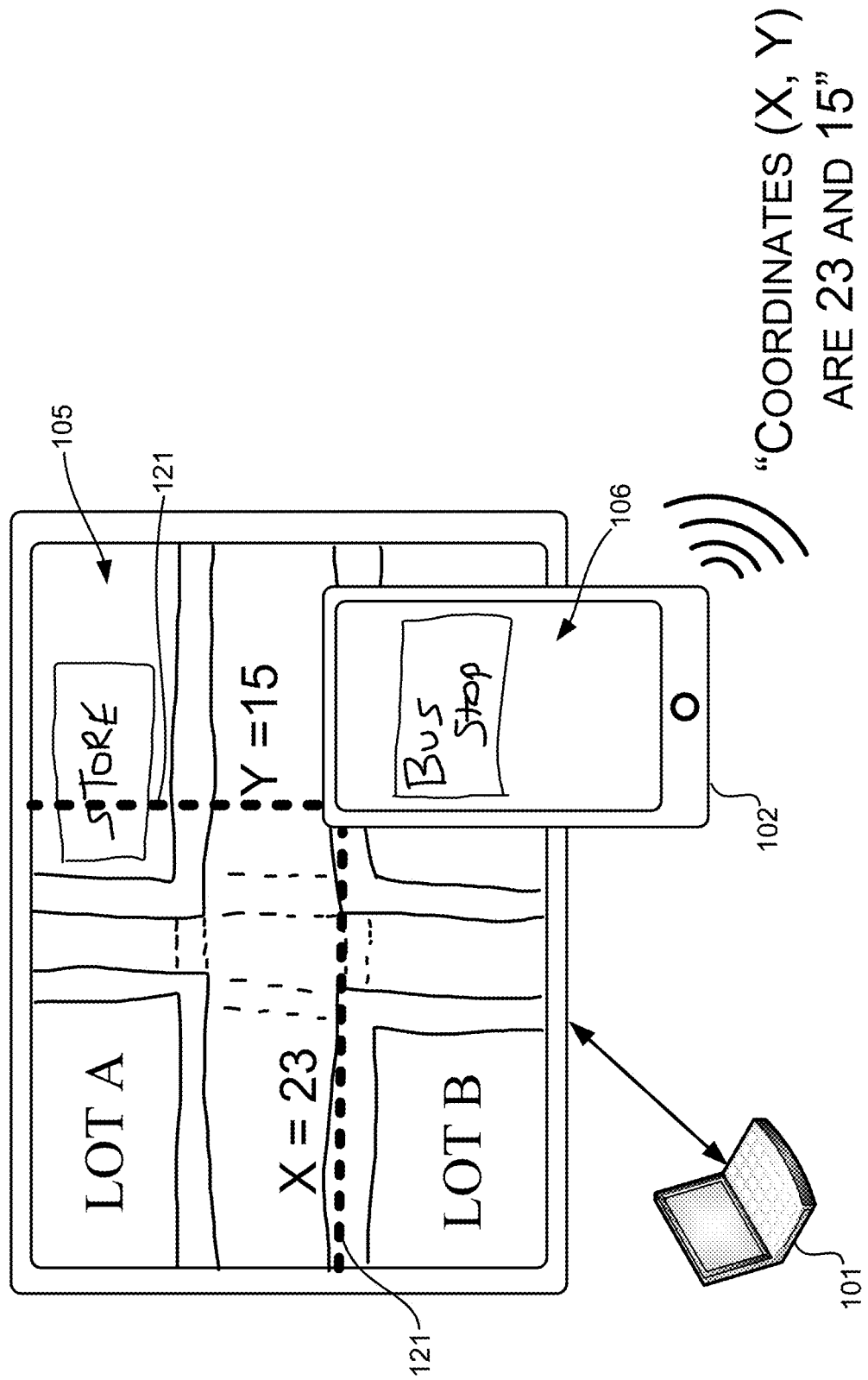
FIG. 1C shows a graphical representation and other notifications that may be used to indicate a selected position for merging content.

As the user moves the second computer 102, either computer can generate audible or graphical indicators to guide the user to a desirable position. For example, as shown in FIG. 1C, the first computing device 101 may generate one or more visual elements 121 indicating coordinates of the anchor point 120. In this example, dashed lines are rendered on the first content 105 to show a location where the second content 106 is to be positioned. Text indicators, such as the coordinates shown in FIG. 1C, can also be displayed to guide the user. In addition, either computer can generate an audio output to indicate a position where the second content 106 is to be placed. In this example, an audio output includes a computer-generated voice output indicating the coordinates of the anchor point 120. In another example, a natural language output can provide an audio representation of an anchor point to guide a user. For instance, in this example, an audio output may state, "the bus stop is positioned over an empty lot on the southeast corner of the intersection," or the audio output may provide guidance, such as "the bus stop is out of alignment with the empty lot on the southeast corner of the intersection," etc.

When the user aligns the second content 106 at a desirable position relative to the first content 105, the user can provide an input to confirm the anchor point 120. The input can be any type of gesture, key input, voice input, button input, or any other type of user or machine input. In one illustrative example, the user can provide a voice input and/or a UI gesture to confirm the anchor point 120. In another example, the user can tap (i.e. touch) the second computer 102 to the display screen in communication with the first computer 101 to confirm the anchor point 120. The input can also be a computer-generated input. For example, when the second computer 102 is held in one position for a predetermined period of time, the second computer 102 may automatically generate the input to confirm the anchor point 120.

Figure 1D:
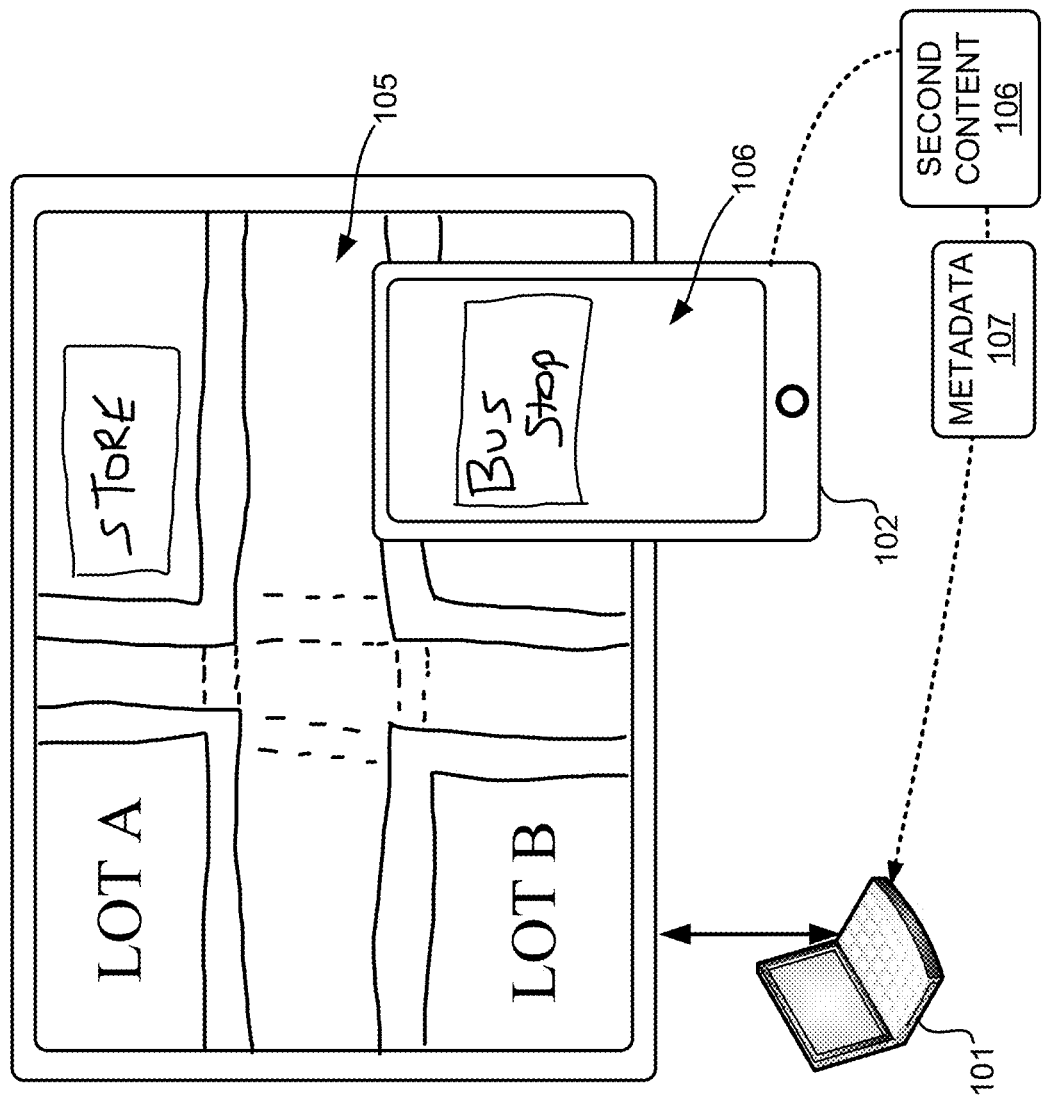
FIG. 1D shows how data can be communicated between the computing devices of the system.

In response to the input, as shown in FIG. 1D, the second content 106 can be communicated from the second computer 102 to the first computer 101. The second content 106 can be communicated via a file transfer protocol or by any other suitable mechanism. In addition, in some embodiments, metadata 107 can also be communicated from the second computer 102 to the first computer 101. The metadata 107 can define the anchor point 120 and, potentially, other information related to the second computer 102. For example, the metadata 107 may include a user identity, data identifying input devices, device identifiers, model numbers, screen size parameters, resolution parameters, etc.

Figure 1E:
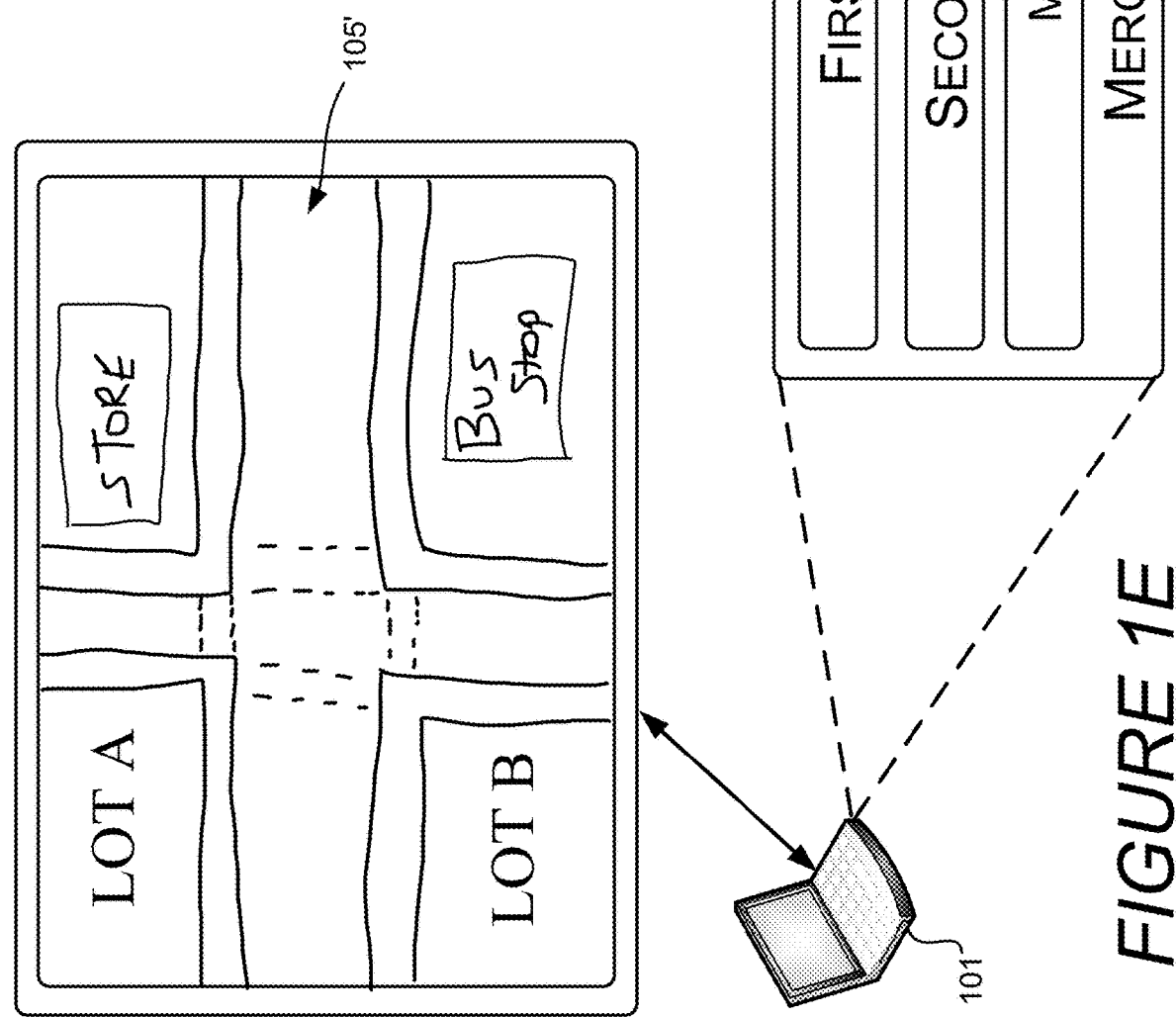
FIG. 1E shows a screenshot of how content may be merged and displayed based on a user gesture.

As shown in FIG. 1E, the data communicated from the second computer 102 to the first computer 101, can be stored in one or more files. In one illustrative example, the communicated data, e.g., the second content 106 and the metadata 107, can be stored in an output file 105' (also referred to herein as an output 105'). In some embodiments, the output file 105' can include the first content 105, which is also referred to herein as merged content 105' or an output 105'. In addition, the second content 106 can be rendered on the display of the first computer 101. The position of the second content 106 can be positioned within the first content 105 based on the determined anchor point 120.

In some configurations, the techniques disclosed herein can augment the borders or margins of a particular file. For example, when content is received at the first computer 101 and the received content is positioned to be outside of the margins or the borders of a canvas or document, the margins or borders may be modified to accommodate the received content.

Figure 1F:
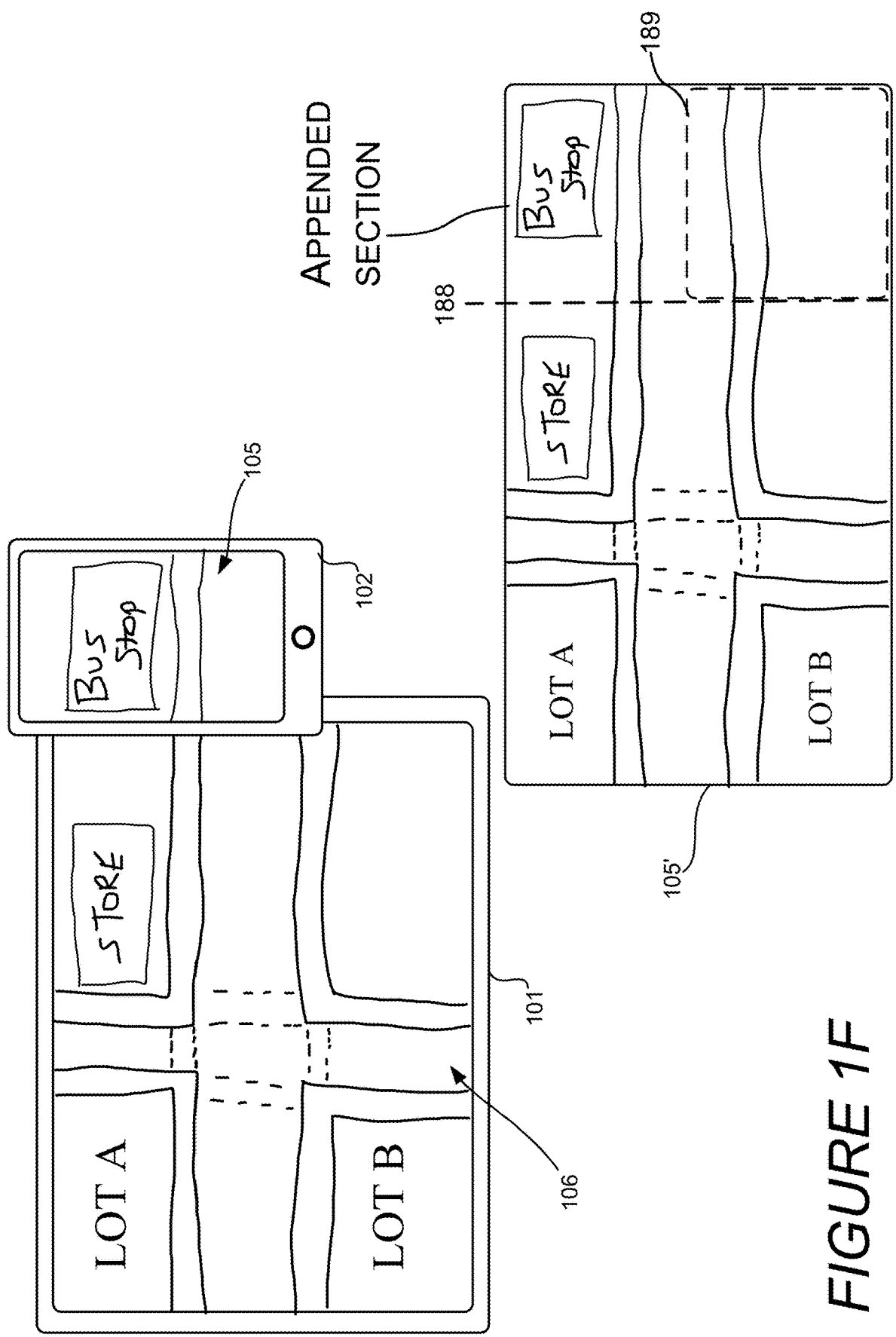
FIG. 1F illustrates a scenario where content is appended to a border of other content.

FIG. 1F illustrates an example where the placement of the second content 106 modifies the borders of the first content 105. In this example, at least a portion of the second content 106 is positioned outside of the borders of the first content 105. When the first computer 101 detects that the anchor point 120 causes any of the second content 106 to be positioned outside of the borders of the first content 105, the first computer 101 can modify original border 188 of the first content 105 to accommodate the insertion of an appended section containing the second content 106. In the example shown in FIG. 1F, the second content 106, e.g., the drawing of the bus stop, is positioned outside of the original border 188 of the first content 105. Thus, the appended section is graphically stitched to the original border 188 of the first content 105. An output 105' can result, as shown.

In some configurations, the system can also generate additional content 189 to accommodate any blank areas that are formed with the insertion of the second content 106. For example, as shown in FIG. 1F, when the second content 106 is added to the first content 105 causing the first computer 101 to modify the original border 188, a blank area below the appended section of the bus stop graphical element is formed. In response to determining the existence of one or more blank areas, the system can generate additional content 189 to fill-in any detected blank areas. In some configurations, graphical elements of the first content 105 can be extended, copied, or otherwise augmented to generate the additional content 189.

In some configurations, the additional content 189 can be generated by the use of one or more techniques, which may include the use of a machine learning module (shown in FIG. 8 and described below) employing one or more machine learning mechanisms. Different machine learning mechanisms may be utilized. For example, a classification mechanism may be utilized to analyze the first content and the second content to determine one or more graphical elements to be generated. The classification mechanism may classify the display elements into different categories that provide an indication of whether an element, such as a road or sidewalk, is to be extrapolated.

In other examples, a statistical mechanism may be utilized to determine the graphical elements to be generated. A linear regression mechanism may be used to generate a score that indicates a likelihood that a particular graphical element may be generated. Linear regression may refer to a process for modeling the relationship between one variable with one or more other variables. Different linear regression models might be used to calculate the score. For example, a least squares approach might be utilized, a maximum-likelihood estimation might be utilized, or another approach might be utilized. Such techniques may be utilized to analyze and score different types of elements within the content. As shown in the example of FIG. 1F, the street and sidewalk of the first content 105 was analyzed, and in this example, the portion of the content showing the sidewalk and street are extended. Such content is incorporated in the additional content 189 and rendered with the first content 105.

In some configurations, when the second content 106 is positioned outside of the border of the first content 105, one or more notifications can be generated. In some embodiments, a graphical element may be displayed to show that a user is outside of the margins or border of a particular file. In one illustrative example, the system may bring highlight to a border, e.g., the border 188 shown in FIG. 1F.

In another example, the system may generate an audible output signal to notify the user that the second content 106 is positioned outside of the margins or border of a particular canvas. This feature gives the user notification when content is to be appended to the edge of a document or canvas. Providing such indicators can guide users to keep content within a canvas and/or provide a notification when the borders or margins of a canvas are modified.

The second content 106 can be displayed with the first content 105 using a scaling factor. The scaling factor, also referred to herein as the scale factor, is a number which scales, or multiplies, a size of a rendering. For example, when a scale factor of 1 is applied to an image or text, a second rendering using this scaling factor is the same size as an original rendering. However, when a scale factor of 0.5 is applied to an image or text, a second rendering using this scaling factor is half of the size as the original rendering.

The scaling factor can be based on one or more factors, such as, but not limited to, preference data, a voice input of a user, gestures performed by a user, or knowledge of a computer, etc. Knowledge of a computer can include a user identity, data identifying input devices, device identifiers, model numbers, screen size parameters, resolution parameters, etc. Using such data can enable the system to select a predetermined scaling factor when a device having a particular screen resolution is utilized.

In one illustrative example, a predetermined scaling factor can be used when the second computer 102 is an IPHONE 6 or a SAMSUNG GALAXY 8. In such an embodiment, configuration data may associate various models with one or more scaling factors. When a particular model number is indicated in the metadata, a corresponding scaling factor can be selected, which can cause the size of a rendering of the second content 106 that is concurrently displayed with the first content 105 to be scaled.

The scaling factor can also be based on one or more user preferences. In such embodiments, preferences stored in association with a particular user, along with a user identity, can be utilized to select a particular scaling factor. In one illustrative example, preference data can associate various users or devices with one or more scaling factors. When a particular user or device identifier is indicated in the metadata, a corresponding scaling factor can be selected, which can cause the size of a rendering of the second content 106 that is concurrently displayed with the first content 105 to be scaled.

Figure 2A:
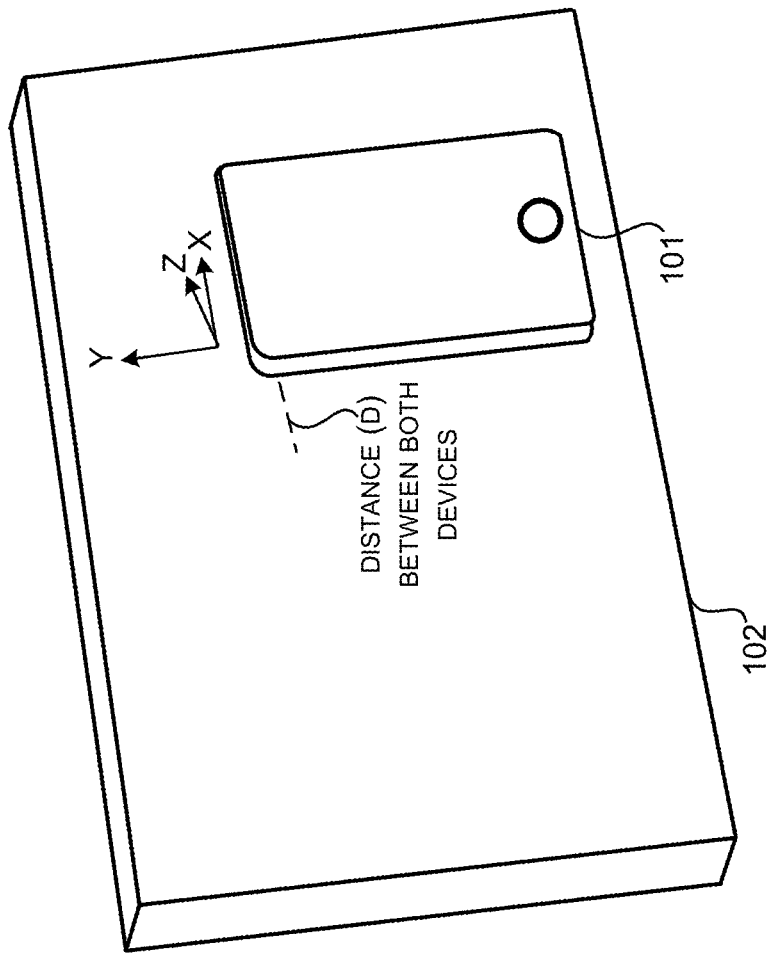
FIG. 2A is a block diagram showing how a distance between two computers can be used to determine a scaling factor for displayed content.

The scaling factor can also be based on one or more gestures performed by a user. In one illustrative example, as shown in FIG. 2A, the scaling factor can be based on a distance (D) between the computers. As the user physically moves the second computer 102 in the Z direction, closer to or further from, the display screen, the scale of the second content 106 can change. In one illustrative example, a user can move the second computer 102 toward the first computer 101 to decrease the scaling factor, or the move the second computer 102 away from the first computer 101 to increase the scaling factor. As described above, an anchor point for the second content can be determined when the user moves the second computer 102 in the X and/or Y direction, Voice commands or other forms of import can also be used to determine a scaling factor used to merge, e.g., graphically stitch, the content of the two computers. A user can issue a command, such as, "enlarge content," "shrink content," etc.

The scaling factor can also be based on an input command via a user interface. As shown in FIG. 2B, one or more graphical control elements 201 may be displayed. In one example, the graphical control element 201 may include a slide bar, a radial controller, or any other suitable controller. While the user is aligning the second content 106 of the second computer 102 to the display of the first content 105 of the first computer 101, the user can interact with the graphical control element 201 to change the scale of the second content 106. The user can select a desired scaling factor for the second content by providing an additional input, e.g., pressing the center button of the radial controller or issuing a voice command. In response to the command, the second content 106 can be scaled and communicated to the first computer 101.

Figure 3B:
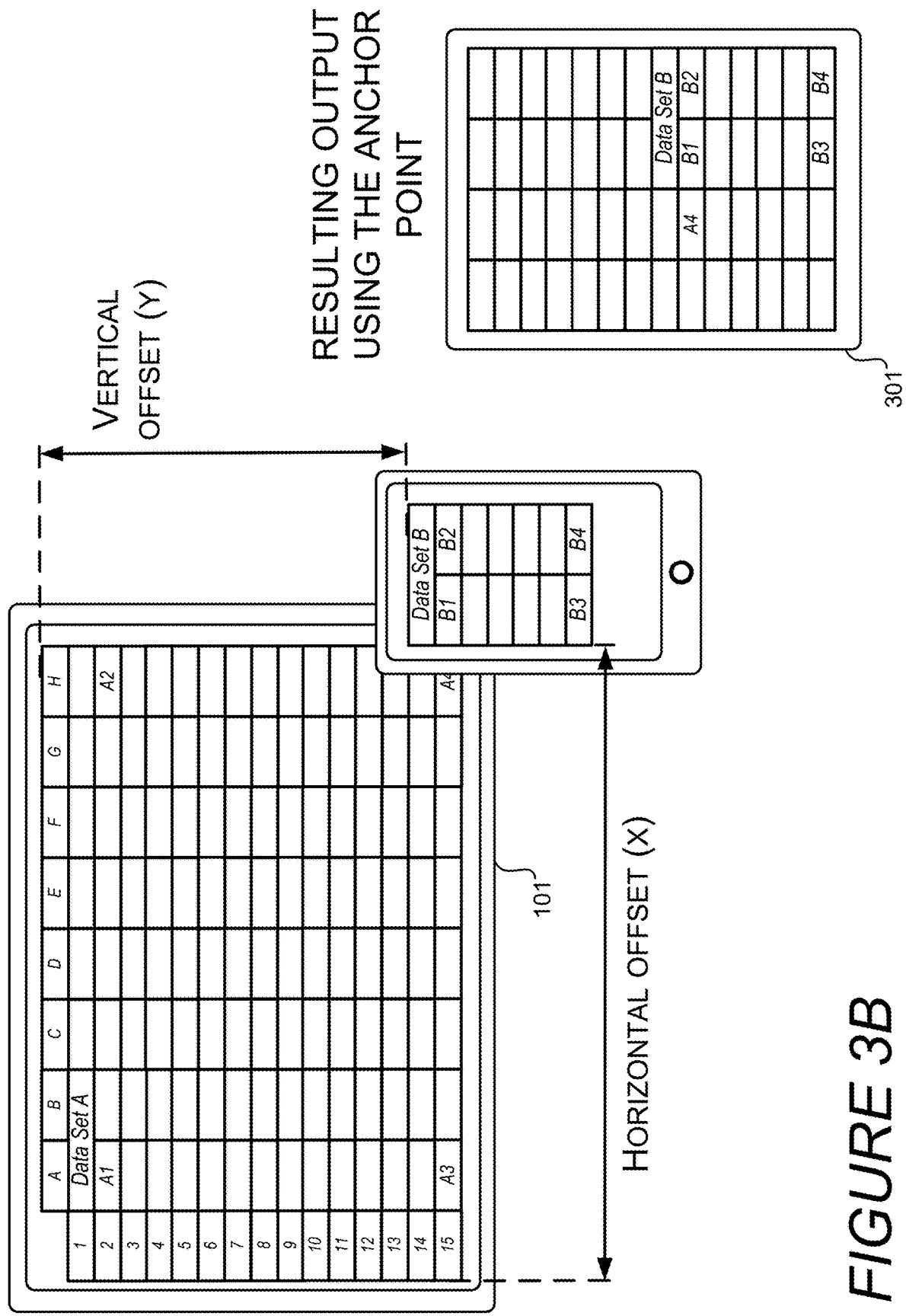
FIG. 3B shows an example of how an alignment between two computers can be used to determine an anchor point for merging data.
Figure 3C:
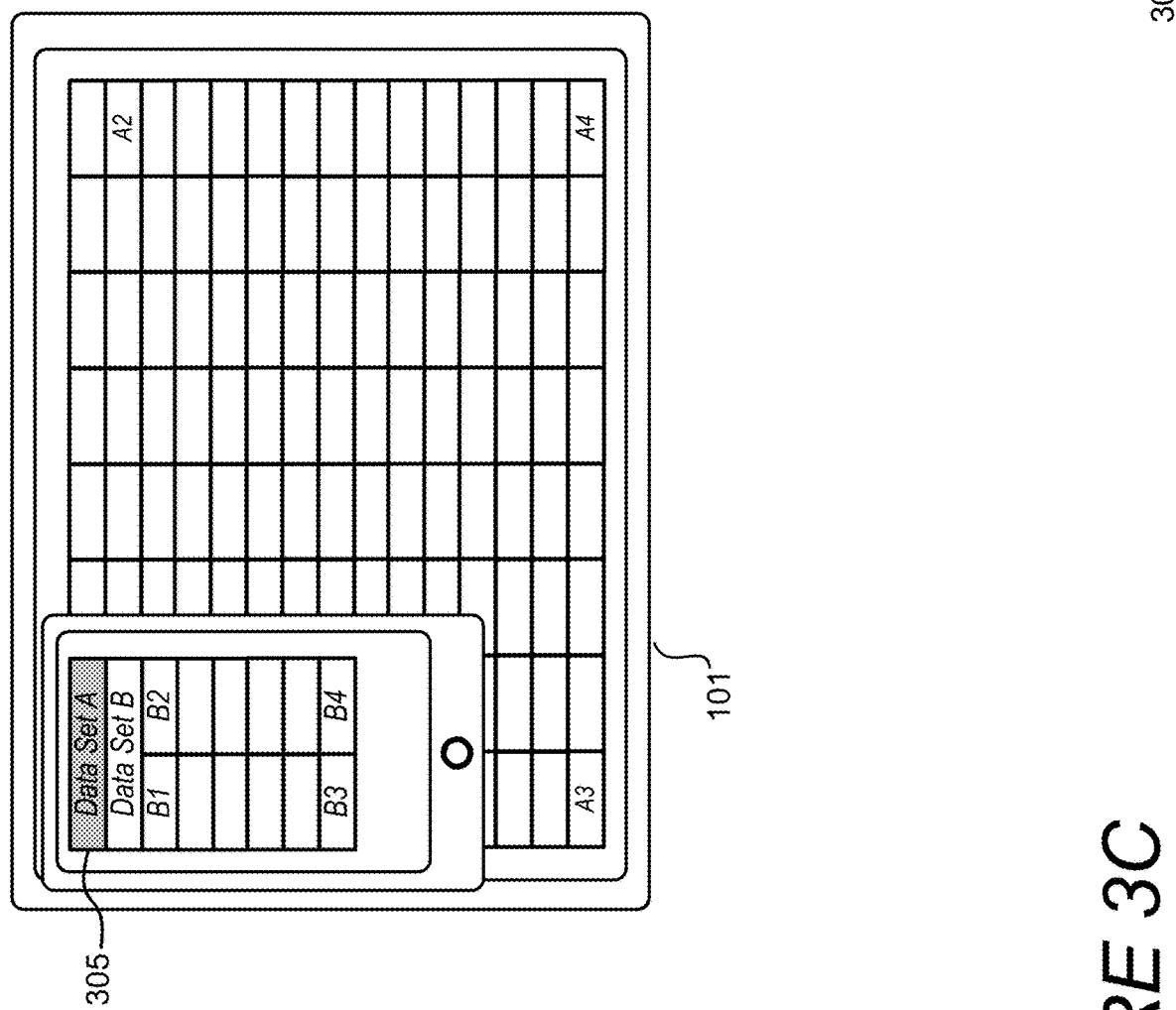
FIG. 3C shows a screenshot of a user interface that displays a graphical element for assisting users to align content.

As summarized above, the techniques disclosed herein can apply to any type of data, such as image data, whiteboard data, document data, etc. FIGS. 3A-3C illustrate an example where spreadsheet data is communicated and graphically stitched to other spreadsheet data based on a simplified user gesture. FIGS. 4A-4E illustrate an example where data defining 3D objects is communicated and graphically stitched to data defining 3D environments.

As shown in FIGS. 3A and 3B, a user can merge the spreadsheet data of the second computer 102 (second content 106) with the spreadsheet data of the first computer 101 (first content 105) by aligning the two devices. As shown in the sample output 301 on FIG. 3B, the second content 106 has been appended to the first content 105 based on a position of the second computer 102. In this example, the second content 106 is inserted into the first content 105 starting at cell H14.

Voice commands can also be utilized to place text and/or data at a particular location. For instance, in the spreadsheet example, the user can indicate that they would like a selected section, e.g., "cells A1 through A3" to be placed at a particular location, e.g., "at cell A4 of file X."

Similar to the example described above, second content 106 can be communicated from the second computer 102 to the first computer 101. The communication of the content 106 can also involve the communication of metadata. The metadata may also comprise text properties and drawing properties. Text properties may include a font color, font size, font type, etc. The text properties can also indicate that text or other objects may be bold, underlined, etc. Drawing properties can indicate a line width, a color, an object shape, a fill color, a line color, ink pattern, etc.

When the second content 106 is graphically stitched and rendered with the first content 105, text properties or drawing properties can be selected based on one or more resources. In one illustrative example, the text properties or drawing properties can be adopted from the content displayed on the first computer 101, e.g., the large-screen device. In another example, the text properties or drawing properties can be adopted from the content displayed on the second computer 102, e.g., the mobile device. Other factors may be utilized in the selection of the text properties or drawing properties. For instance, user preferences, a user-controlled input, a device type or other factors may influence the selection of the text properties or drawing properties.

In another illustrative example, the content can be analyzed to determine and select text properties or drawing properties. If the content appears to be work-related, certain properties may be selected, however if the content does not appear to be work-related, other properties may be selected.

In yet another illustrative example, the text properties or drawing properties may be selected based on a source file. For example, if a large-screen device displays text having a font size of 10, and a mobile device displays text having a font size of 8, the first content of the large-screen device may maintain the font size of 10 while the transferred content from the mobile device may maintain a font size of 8.

In some configurations, the system can provide an augmented reality view to help users align the content displayed on both computers. For instance, in the example shown in FIG. 3C, the second computer 102 can display a portion of the first content 105 concurrently with the second content 106. By showing the content of both computers on one display screen, a user can readily see how the first content 105 aligns with the second content 106. In the example of FIG. 3C, the text "Data Set A," which is a portion of the first content 105, is displayed on the second computer 102.

The display of the first content 105 on the second computer 102 can be displayed using an augmentation 305, such as a highlight, to distinguish the first content 105 from the second content 106. Once the user confirms this position, the second content 106 can be merged and/or displayed on the first computer 101. In this example, another sample output 302 is generated. In this particular example, the second content 106 is inserted into the first content 105 starting at the second row of the first column.

The augmented reality view can be implemented using one or more techniques. In some embodiments, the first content 105 can be communicated to the second computer 102, and at least a portion of the first content 105 is displayed on the second computer 102. However, other techniques for facilitating this type of display can utilize other implementations. For example, the display screen of the second computer 102 can be transparent or semitransparent while also presenting graphical renderings to a user. Thus, the user can concurrently view the first content 105 and the second content 106 by viewing a portion of the first content 105 through the display screen of the aligned second computing device 102 while the second content 106 is also rendered on the display screen 102. In another embodiment, a camera in communication with the second device 102 can capture images of the first content 105. The captured images can be displayed on the display screen of the second computer 102 along with a rendering of the second content 106 to assist the user in adjusting the alignment between the first content 105 and the second content 106.

The system disclosed herein can also generate audio and visual guides to assist users in placing content at a desirable location. For instance, in the spreadsheet example described above, while the user is aligning spreadsheet cells, the computer can provide a visual indicator instructing the user to move content to the left or to the right to align cells in a particular manner. In another example, select borders of certain cells can be highlighted to guide users on moving content to a desired location. Such embodiments may be useful when certain types of data need to be aligned with data having a similar data type. A periodic audio output having a cadence that changes to guide users can also be used. For instance, as a user moves closer to a desired location, the cadence of the output can increase.

Figure 3D:
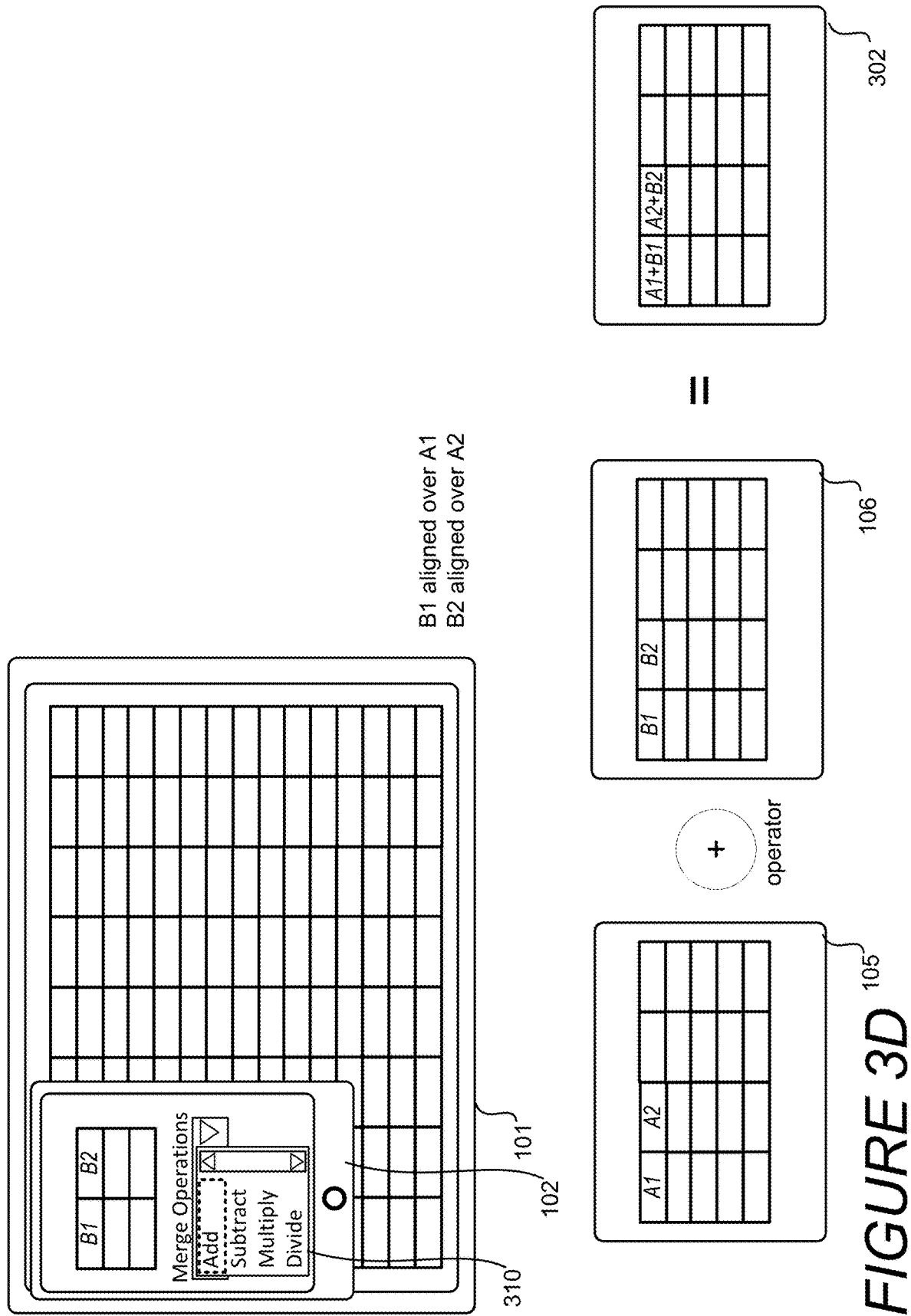
FIG. 3D shows a screenshot of a user interface that enables a user to select an operation for merging the first content that is aligned with the second content.

As shown in FIG. 3D, some embodiments can enable a user to merge the first content 105 and the second content 106 in different ways. For instance, while the user is positioning the second content 106, the second computer 102 can provide a number of options that allows a user to select an operator for merging the content. In this example, the second computer 102 provides a menu 310 with a number of operations, which include, but are not limited to, adding, subtracting, dividing, and multiplying.

This example involving numerical data is provided for illustrative purposes and is not to be construed as limiting. Other types of operations can be applied to a wide range of data types. For instance, if the first content involves a drawing of a first electronic waveform and the second content involves a drawing of a second electronic waveform, a number of operations involving convolution or correlation can be used to generate merged data using one or more of the selected operations. In other examples, if the first content and second content involve graphical elements such as inking gestures (hand-drawn objects using a digital pen or touch screen), the operators can include graphical filters, color merging techniques, etc. In addition, a user may utilize other forms of input to select an operation. For example, instead of a menu, a user may provide a voice command or input gesture to indicate an operation used for merging content.

For illustrative purposes, the example shown in FIG. 3D includes two sample input data sets. The first content 105 comprises two values in the first two columns of the first row: A1 and A2. The second content 106 comprises two values in the first two columns of the first row: B1 and B2. In this example, the user holds the second computer 102 in a position that aligns B1 over A1 and aligns B2 over A2. The second computer 102 can display one or more menus allowing a user to select an operator. In other configurations, the second computer 102 can receive voice commands or other gestures allowing a user to select an operator. In this example, the user has selected the operator for adding the first content and the second content. In response to such a user selection, the second computer 102 can process the first content 105 and the second content 106 according to the selected operation. In this case, the values of the aligned cells are added, as shown in the resulting output 302.

Turning now to FIGS. 4A-4E, a system 100 for processing and displaying 3D data is shown and described below. In this illustrative example, the first computing device 101, which can be in the form of a large-screen device, can receive 3D data 401 defining a three-dimensional environment. The 3D data 401 can include mesh data 411 and image data 411. The mesh data 411 can define a location and shapes of one or more objects and the image data 412 can include texture maps for the objects. The objects can include virtual objects or models of real-world objects.

In this illustrative example, the 3D data 401 is captured by a head-mounted display 402 (HMD 402) worn by a user 403 surrounded by a real-world environment 405. The HMD 402 can generate the 3D data 401 by the use of one or more cameras and a depth mapping sensor. This example is provided for illustrative purposes and is not to be construed as limiting. It can be appreciated that the 3D data 401 can be generated by different types of computers having different types of sensors.

Figure 4A:
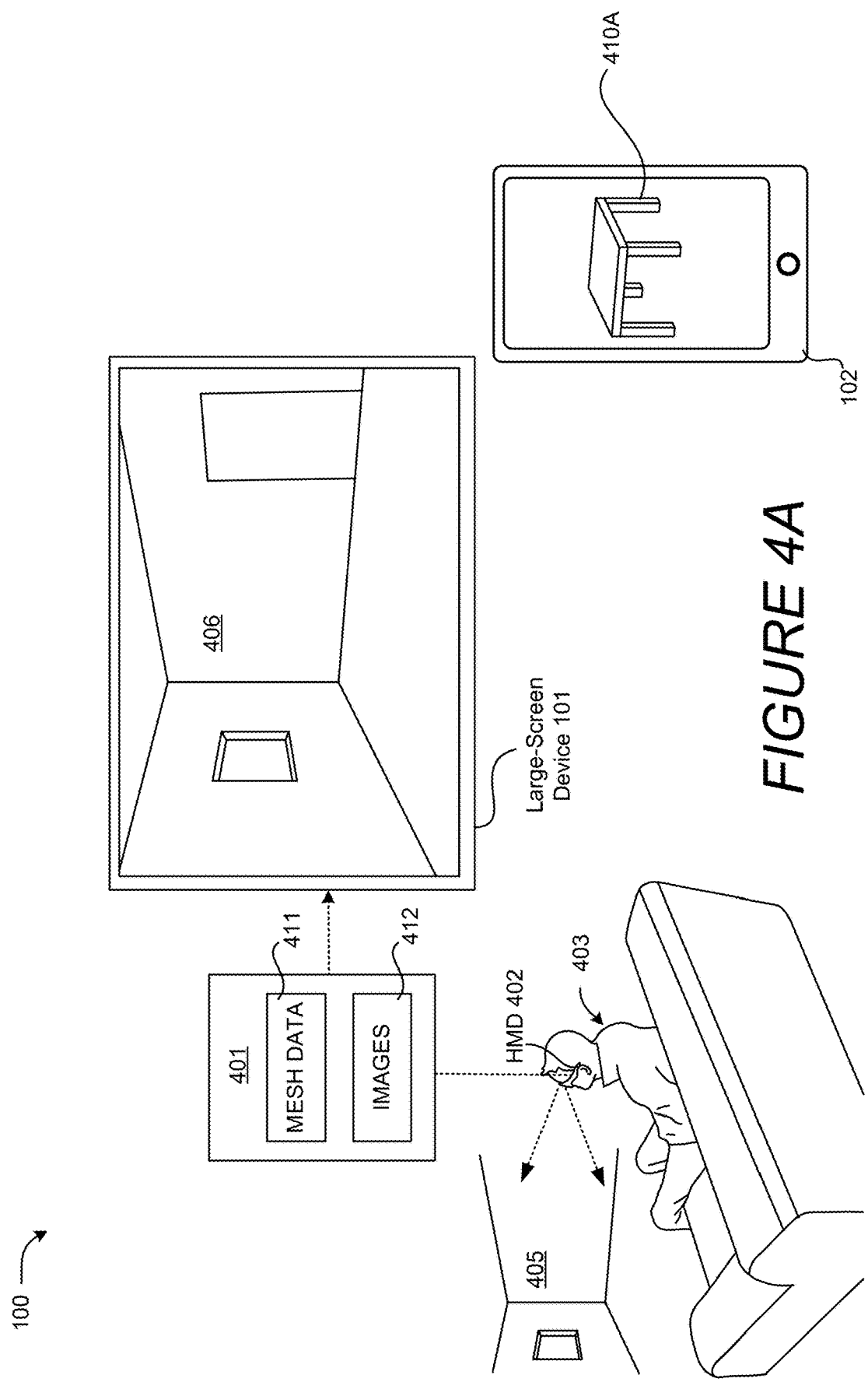
FIG. 4A shows a scenario involving a display of a three-dimensional ("3D") environment.
Figure 4B:
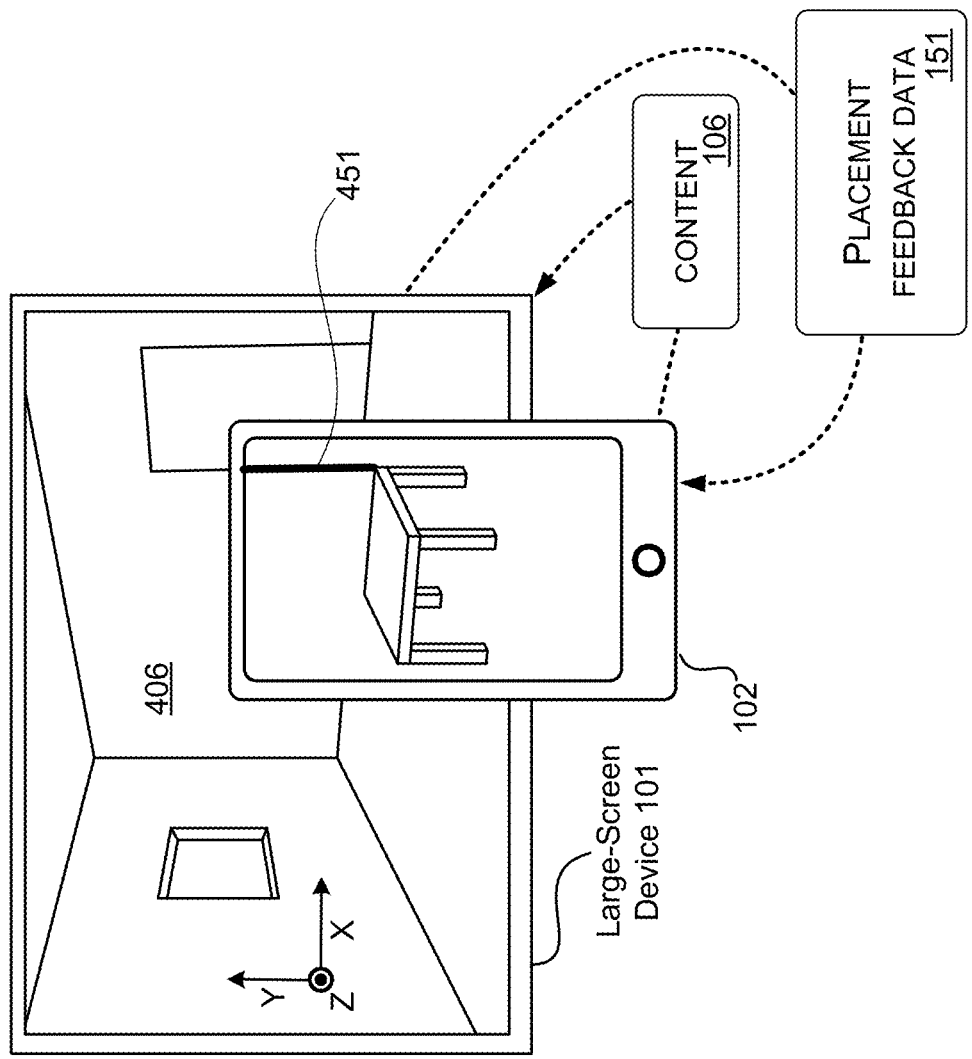
FIG. 4B illustrates an example of how a user can position a second computer over a first computer to merge 3D objects with 3D objects of a 3D environment.

In this example, the first computer 101 displays a rendering 406 of the 3D data 401. Also, in this example, the second computer 102 displays a rendering of a first virtual object 410A (second content 106). As shown in FIG. 4B, the first virtual object 410A can be positioned by aligning the second computer 102 relative to the rendering 406 of the 3D data 401.

In some configurations, horizontal or vertical movement of the second computer 102 can control an X and Y position of the first virtual object 410A within the virtual environment 406. In addition, a distance between the computers can control a Z position within the virtual environment. As will be described in more detail below, other forms of input, including a voice input, can also be used to position objects within a three-dimensional environment.

As also shown in FIG. 4B, the first computer 101 can provide one or more visual cues or a voice output to help the user align the content. In this illustrative example, placement feedback data 151 can include at least a portion of the 3D data 401. Aspects of the 3D data 401 can be displayed on the second computer 102. In this example, a portion of the doorway 451 is rendered on the second computer 102 to help the user align the table with features of the 3D data 401.

Figure 4C:
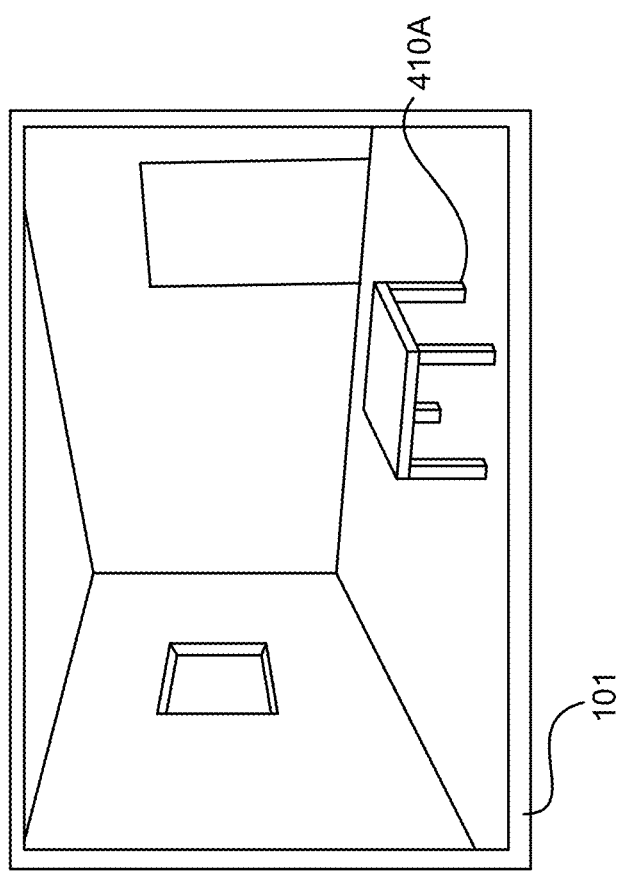
FIG. 4C illustrates an example rendering of an output showing merged content.

In another example, a computer-generated voice output may provide information about the 3D data 401 to help guide the user. For example, with reference to FIG. 4B, a voice output may indicate that, "the table is aligned with the door," or a suggestion can be made to "move the table to the right to align the table with the door," etc. As shown in FIG. 4C, once the position of the second content is selected, the first computer 101 can display the second content 106, e.g., the first virtual object 410A within the virtual environment.

Figure 4D:
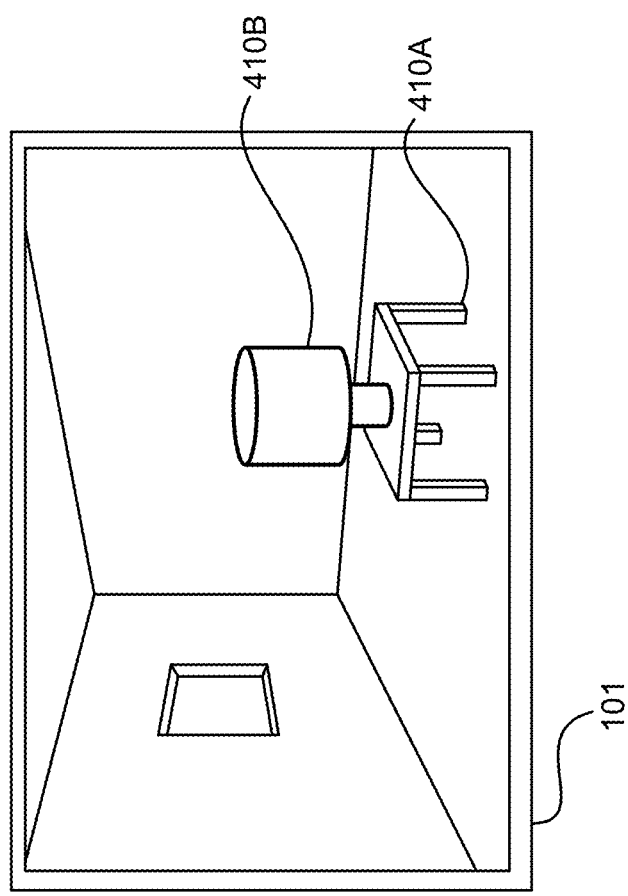
FIG. 4D illustrates an example scenario where a user can use different types of gestures to place a virtual object within a virtual environment.

As summarized above, other types of user input can be used to determine a position for a particular object. The example shown in FIG. 4D shows a rendering of the virtual environment that may result when a voice instruction is received by the first computer 101. The voice instruction can identify a particular object and its position. In this illustrative example, the voice instruction may be "place a lamp on top of the center of the table." The result may include insertion of a second virtual object 410B within the virtual environment. Additional voice instructions may be provided to move one or more objects within a virtual environment.

Figure 4E:
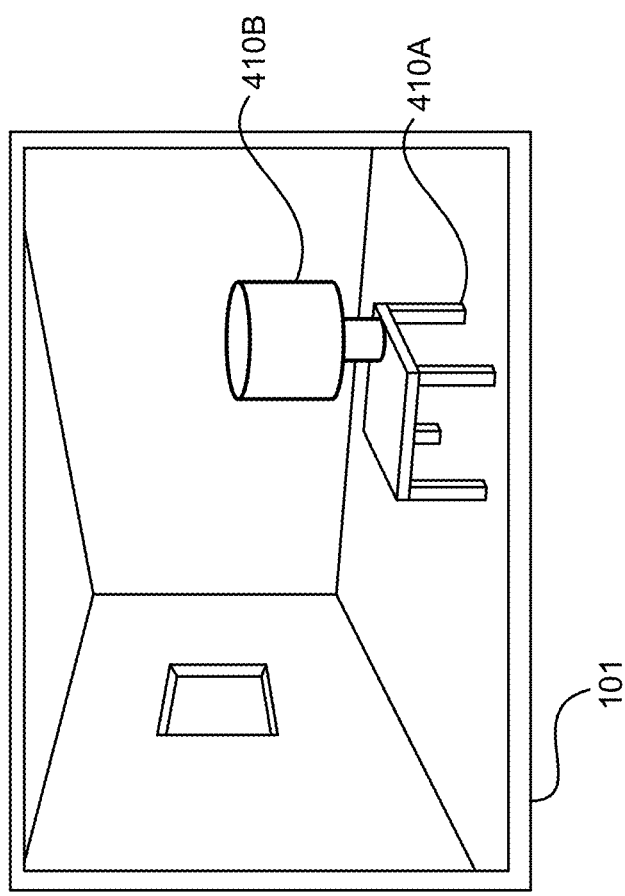
FIG. 4E illustrates an example scenario where a user can move a virtual object within a virtual environment using a simplified gesture.

The additional instructions can include the identification of a particular object and a position of the object. In the example of FIG. 4E, an instruction may be "move the lamp to the right corner of the top of the table."

Figure 4F:
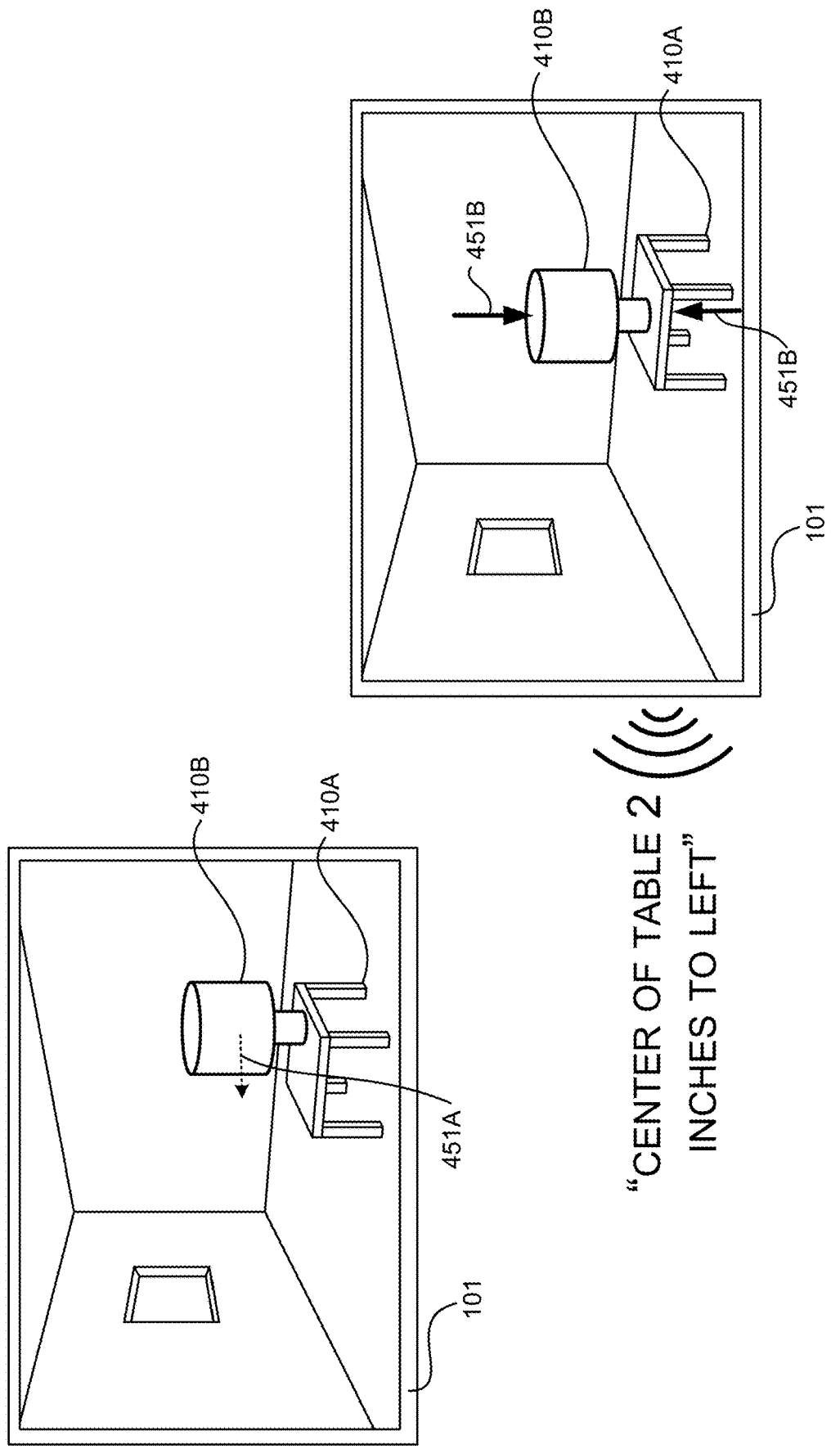
FIG. 4F illustrates different examples of graphical displays and audio signals that may be generated to guide users during the placement of a virtual object within a virtual environment.

The system disclosed herein can also generate audio and visual guides to assist users in placing content at a desirable location. For instance, in the 3D example described above, while a user is aligning a particular object, the system can generate a visual indicator or an audio output to guide user placement of one or more virtual objects. For instance, in the upper-left rendering of FIG. 4F, the first computer 101 can generate a graphical indicator 451A to direct the user to place a virtual object at a desirable location. In this example, the indicator is provided to help a user center the lamp 410B in the center of the top of the table 410A. As the user moves the lamp 410B toward the center of the table 410A, additional visual indicators 451B can be generated to show that the lamp 410B is placed at the center of the table 410A. In addition, or alternatively, an audio output may be generated for the first computer 101 to guide the user and/or to notify the user that an object or data has been placed at a desirable location.

In another illustrative example, the cadence of the periodic sound can be modified based on a distance between the content and a predetermined location. In the example above, as the user moves the lamp 410B toward the center of the table 410A, the cadence of a periodic sound may increase to guide the user toward the center of the table. Such examples can be used to help guide users to move data and/or objects to any location of interest.

Figure 5A:
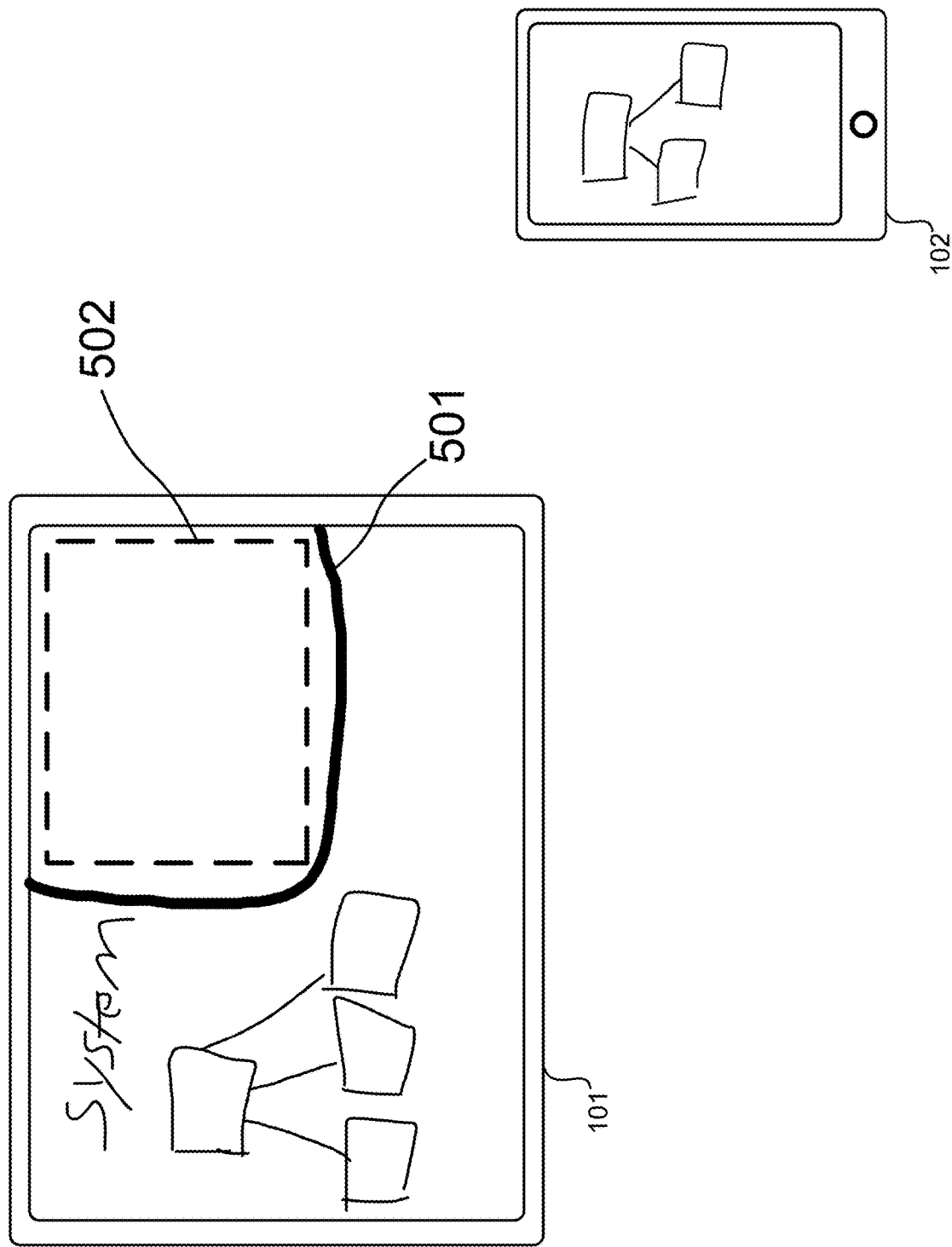
FIG. 5A illustrates an example scenario where a user can define regions that are associated with read or write permissions by the use of an inking gesture.
Figure 5B:
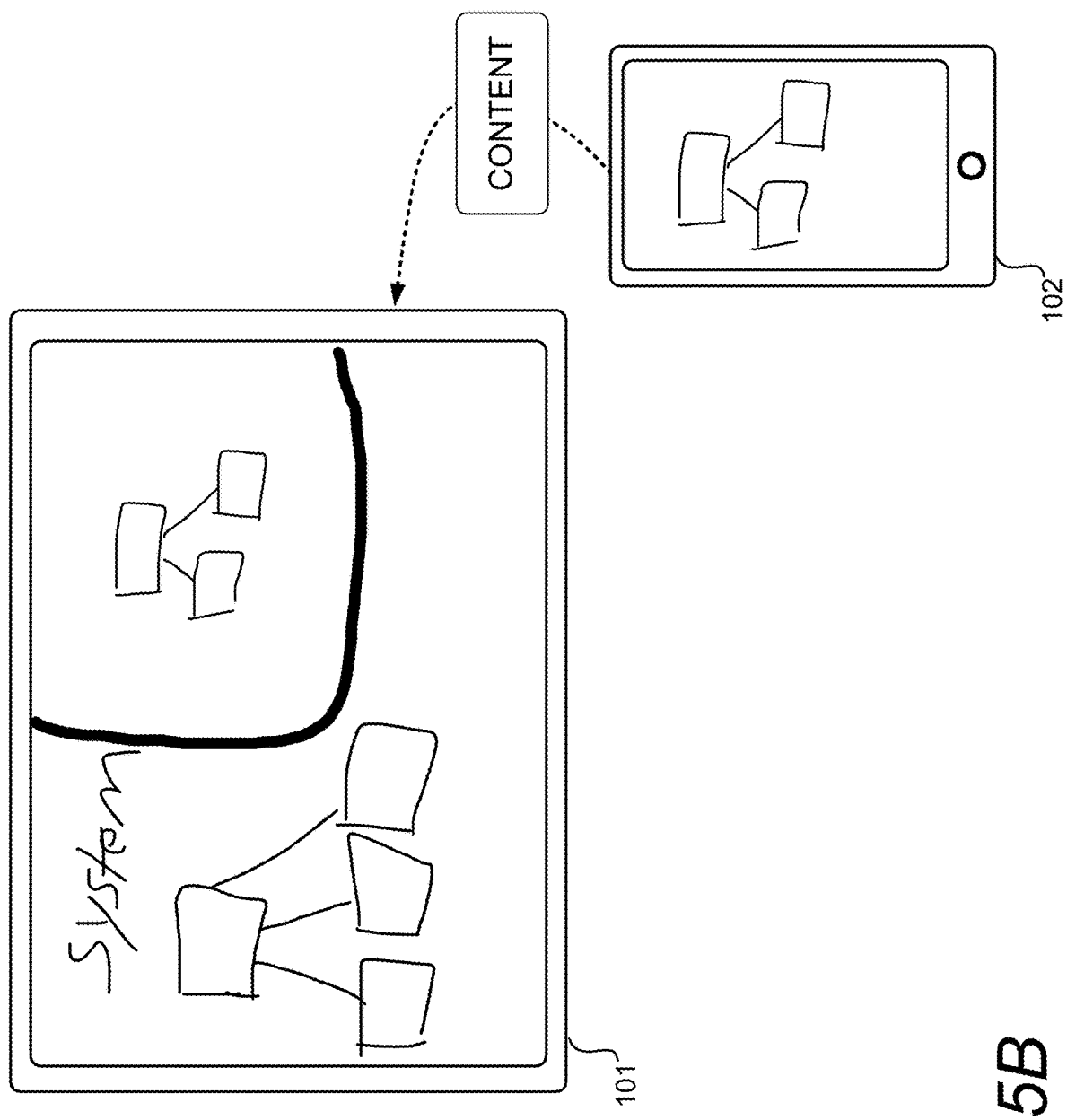
FIG. 5B illustrates an example scenario where content can be transferred between computers based on read or write permissions that are that are associated with a region of a canvas or document.

In another aspect of the present disclosure, a user can control read and write permissions to regions within a drawing canvas or a document by the use of a simplified gesture, such as an inking gesture. To illustrate such features, consider the user scenario illustrated in FIGS. 5A and 5B. As shown in FIG. 5A, a user can provide an ink gesture 501 that defines a region 502 for allowing remote users to provide content. Next, as shown in FIG. 5B, when the user of the second computer 102 transfers the second content 106 to the first computer 101, the first computer 101 permits the transfer of the second content 106 when the first computer 101 can determine that the second content 106 is placed in the permitted region 502. In such an example, if the user of the second computer 102 positions the second content 106 to a location outside of the region 502, the first computer 101 can reject the content. However, if the user of the second computer 102 places the second content 106 to a location within the region 502, the first computer 101 can accept the content and allow the display of the second content 106, as shown.

Figure 6A:
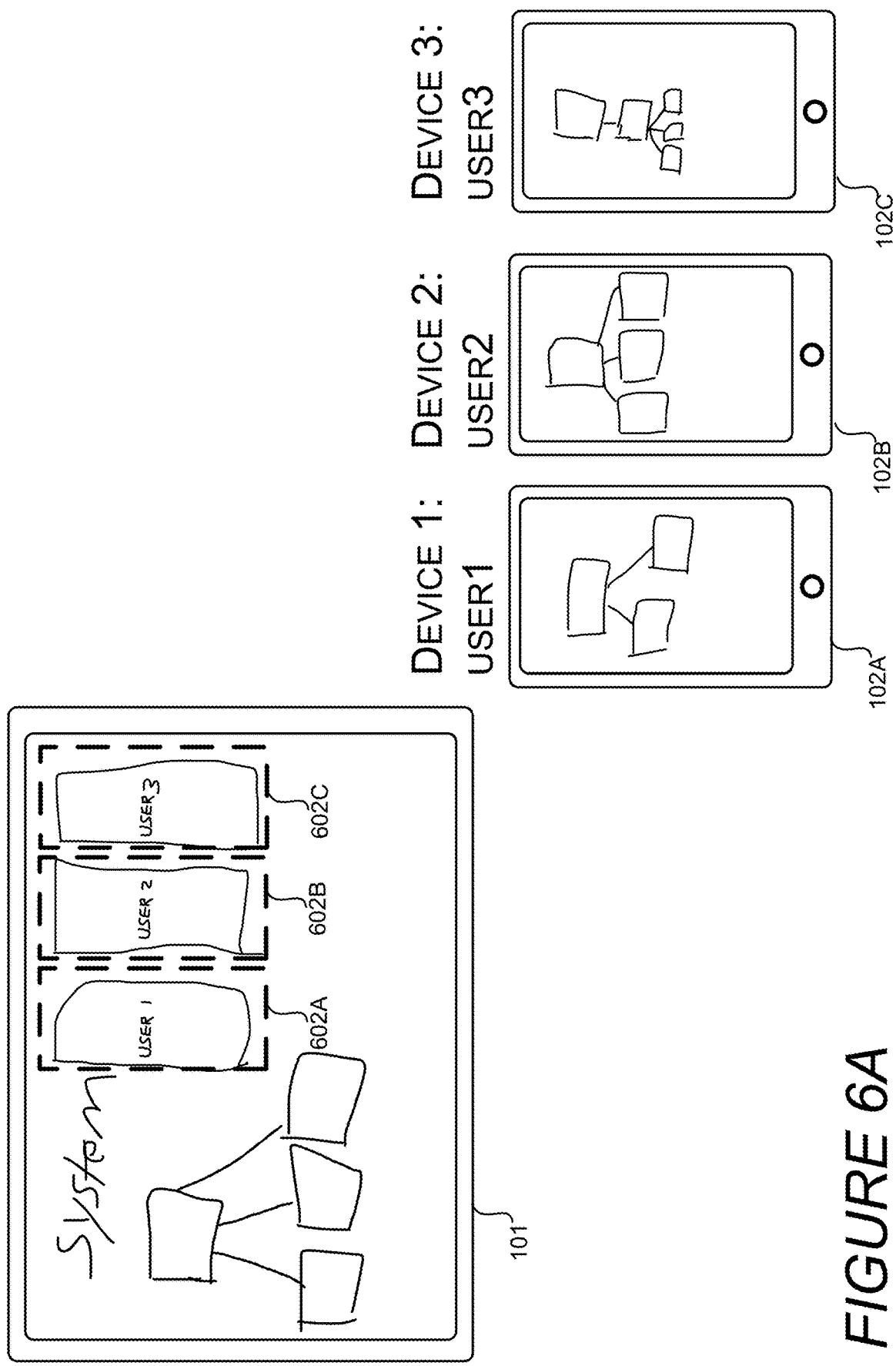
FIG. 6A illustrates an example scenario where permissions for individual devices can be established by the use of an inking gesture.

This example is provided for illustrative purposes and is not to be construed as limiting. It can be appreciated that the region 502 can also define an area where contributions are not allowed. In addition, the permissions associated with the region 502 can be established on a per device or per user basis. FIG. 6A illustrates an example scenario using such features.

Figure 6B:
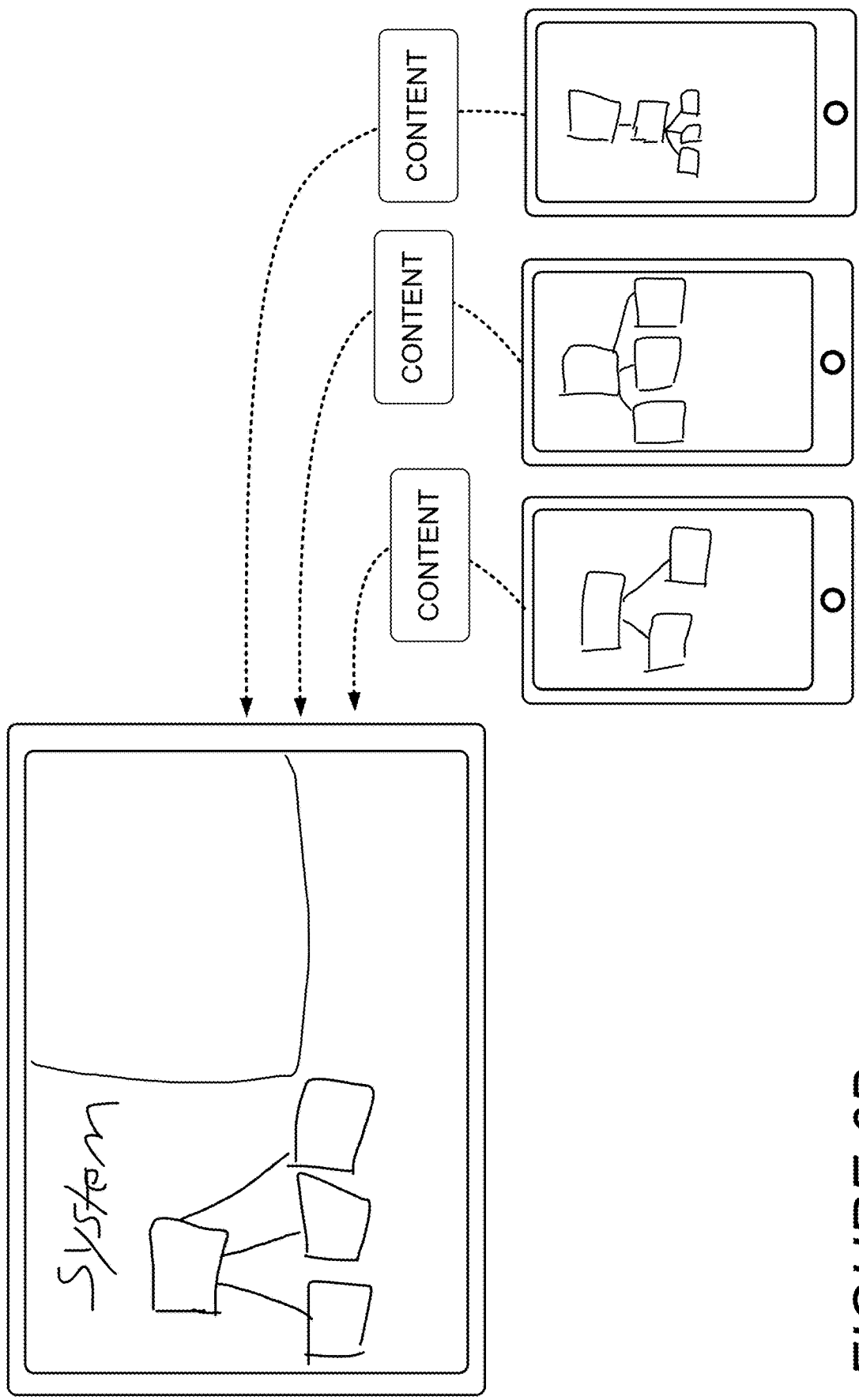
FIG. 6B illustrates an example scenario where content can be transferred between computers based on permissions that are associated with one or more regions of a canvas or a document.
Figure 6C:
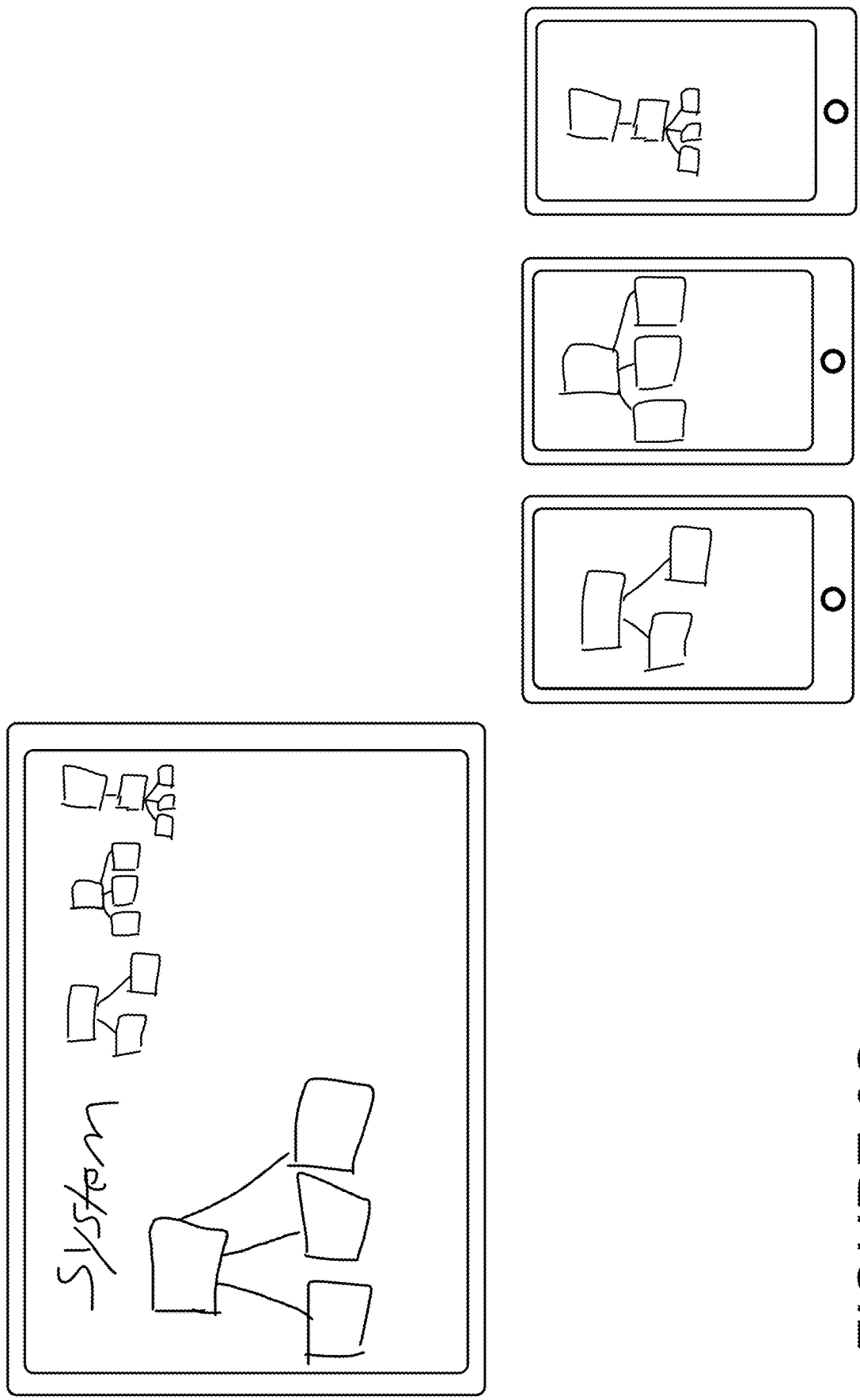
FIG. 6C illustrates an example rendering of merged content that is received from a number of computers having permissions to add content to a drawing canvas.

As shown in FIG. 6A, the system enables a user to define multiple regions (602A, 602B, 602C) that can be individually assigned to a specific user or a specific computer. In this example, three regions are defined by the use of an inking gesture and each region is labeled with an identifier. The identifier can be interpreted by the first computer 101 to associate the region with a user or a device. In this example, a user ID is written in each region and users associated with the specific user IDs are granted permissions to add content to their respective regions. The system grants access permissions for each user to insert content in each of the defined regions. As shown in FIG. 6B, as each user communicates content to the first computer 101, the content associated with each user is positioned in the appropriate region based on each user ID.

The position of the content can be determined by the defined region (602A, 602B, 602C). Thus, when a user of a remote device (102A, 102B, or 102C) communicates content to the first computer 101, the content is automatically positioned within a region designated for a particular device or user at FIG. 6B.

In another embodiment, shown in FIG. 3C, each region (602A, 602B, 602C) can define permissions that allow users to place content in each region and restrict the placement of content outside of each region. Thus, when a user of a remote device (102A, 102B, or 102C) selects a position of content to be placed within the canvas, the first computer 101 determines if the position is within a permitted region for that particular device or user. If it is determined that the position is within the permitted region, the content is displayed on the canvas. If it is determined that the position is not within the permitted region, the content is not displayed on the canvas.

Figure 7:
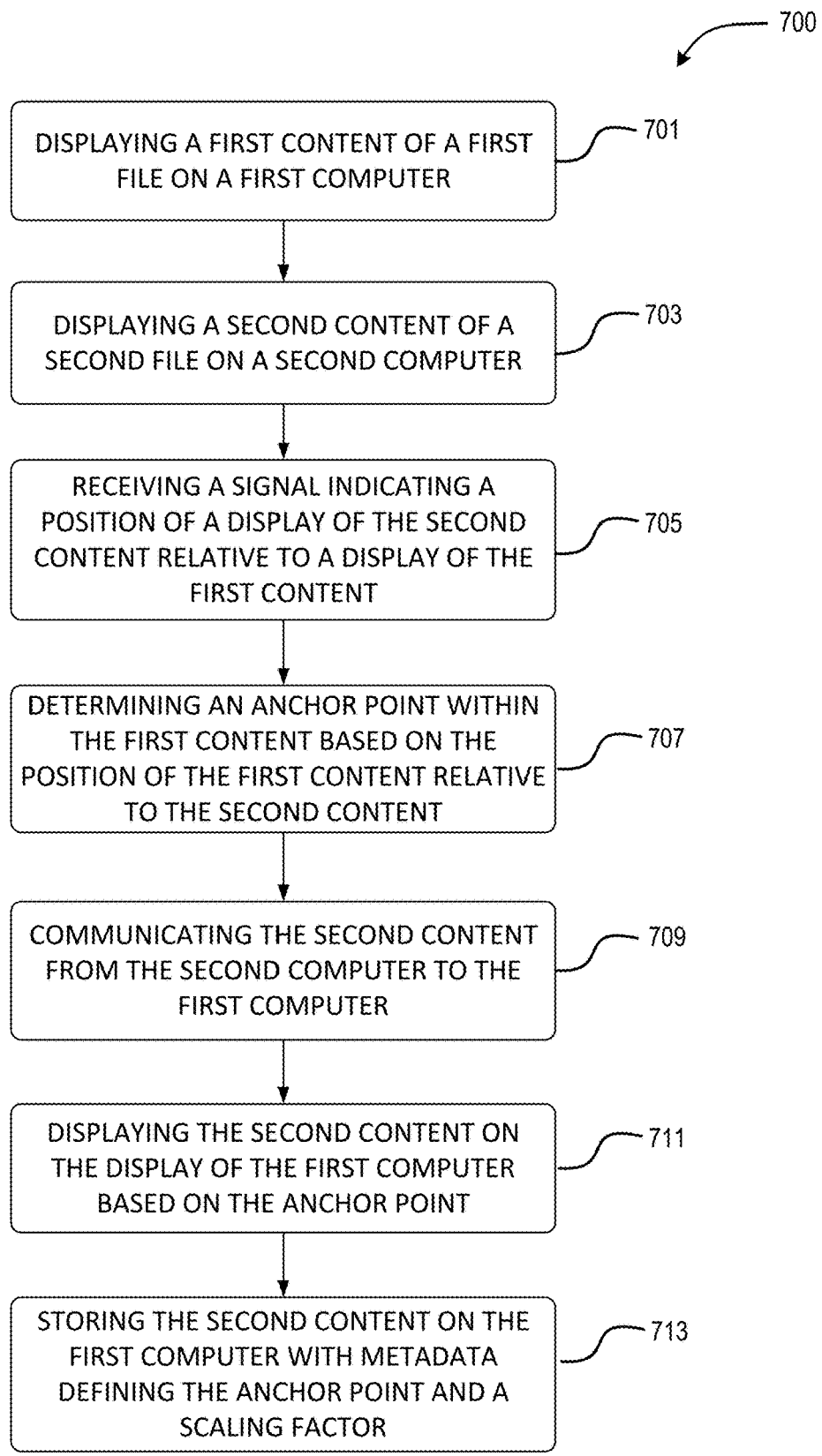
FIG. 7 is a flow diagram showing aspects of a routine for enabling the techniques disclosed herein.

FIG. 7 is a flow diagram illustrating aspects of a routine 700 for enabling aspects of the present disclosure. It should be appreciated that the logical operations described herein with regard to FIG. 7, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 700 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration refers to the components of the FIGS., it can be appreciated that the operations of the routine 700 may be also implemented in many other ways. For example, the routine 700 may be implemented, at least in part, by a processor of another remote computer, processor or circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, the routine 700 begins at operation 701 where a computing module, such as the first application 108 causes a display of the first content 105 on a display screen of the first computer 101. For illustrative purposes, the display screen of the first computer 101 is referred to herein as a "large-screen device." The large-screen device can be a computer itself or it can be a monitor, projector, or any other display device that is in communication with a computer such as the first computer 101.

At operation 703, one or more computing modules, such as the second application 109, causes a display of the second content on a display screen of the second computer 102. As summarized herein, the second computer 102 can in be in the form of a mobile device such as a phone, tablet, etc. For illustrative purposes, the display screen of the second computer 102 is referred to herein as a "small-screen device." Although these descriptions are used, the display screens of the first computer 101 and the second computer 102 do not necessarily have to be a particular size, and the display screens of the first computer 101 and the second computer 102 do not necessarily have to differ in size.

At operation 705, one or more computing modules, such as the first application 108, can receive a signal indicating a position of a display of the second content relative to a display of the first content. As shown in the examples described herein, a user can move the display of the second content 106 over a display of the first content 105. One or more sensors can be used to detect the position of the second content 106 relative to the first content 105. In some configurations, the sensors can be used to detect the position of one display surface relative to another display surface. The signals can be electronic signals from one or more sensors, such as a proximity sensor, a location device, a light sensor, a microphone and speaker combination, etc. In the microphone and speaker configuration, sound beacons can be generated to identify location of one device relative to another.

At operation 707, one or more computing modules, such as the first application 108, can determine an anchor point within the first content based on the position of the first content relative to the second content. As described herein, the anchor point may be based on coordinates that define an offset between reference points in the first content and the second content.

In some configurations, voice commands can be used to help determine or adjust an anchor point. In one illustrative example, a voice command can be received at a sensor in communication with the first computer. The voice command can describe a location for the second content to be placed within the first content. The voice command can be interpreted to generate coordinates and a rendering of at least one graphical element of the second content can be positioned within the first content based on the coordinates. For illustrative purposes, a graphical element can include any portion of the content, e.g., a three-dimensional object, text, digital ink, etc.

At operation 709, one or more computing modules, such as the first application 108 and the second application 109, can communicate the second content from the second computer to the first computer. In some optional configurations, the second content 106 can be communicated from the second computer 102 to the first computer 101 in response to a user input confirming the anchor point. The input confirming the anchor point includes at least one of, receiving an input at a user interface element, receiving a signal indicating that the second computer contacted the first computer, a voice command confirming the location, or a voice command indicating the anchor point.

Operation 709 can also include the communication of metadata defining the anchor point and a scaling factor. The metadata can also include a user identity, data identifying input devices, device identifiers, model numbers, screen size parameters, resolution parameters, etc.

At operation 711, one or more computing modules, such as the first application 108, can display the second content 106 on the display screen of the first computer 101 based on the anchor point. Examples of operation 711 are shown in FIG. 1E and FIG. 4C. In some optional configurations, the display the second content 106 on the display screen of the first computer 101 can be in response to a user input confirming the anchor point. The input confirming the anchor point includes at least one of, receiving an input at a user interface element, receiving a signal indicating that the second computer contacted the first computer, a voice command confirming the location, or a voice command indicating the anchor point. Such embodiments enable the system 100 to detect whether a user has pressed a button, tapped on a user interface, tapped the second computer to the first computer, issued a voice command confirming a location, or issued a voice command indicating a location to place content, e.g., "place the table on the center of the table."

In some configurations, the display of the second content 106 can be controlled by one or more factors. For instance, permissions can be granted by the use of an inking gesture defining a region. If the second content 106 is positioned within the region, the first application 108 can allow the display of the second content 106 on the display of the first computer 101. If the second content 106 is positioned outside of the region, the first application 108 can deny the display of the second content 106 on the display of the first computer 101.

Operation 711 can also involve permissions that are based on an identity, such as a machine identity or a user identity. For example, an inking gesture or another form of input can indicate an identifier. The first application 108 can determine if the identifier is associated with the second content 106. In response to determining that the identifier is associated with the second content 106, the first application 108 can allow the communication of the second content 106 from the second computer to the first computer and/or allow the display of the second content 106 on the display screen of the first computer 101. In response to determining that the identifier is not associated with the second content, e.g., the second content is sent from an unidentified person or computer, the first application 108 can prevent the communication of the second content from the second computer to the first computer and/or prevent the display of the second content on the display screen of the first computer 101.

At operation 713, one or more computing modules, such as the first application 108, store the second content 106 in a file on the first computer 101. In some configurations, the second content 106 can be stored in the same file as the first content 105. Metadata 107 defining the anchor point, a scaling factor and/or other parameters, can also be stored in association with a file storing the second content 106. The routine may also repeat operations 705, 707 and 711 to continually display the second content 106 on the display of the first computer 101 as the user physically moves the second computer 102 relative to the first computer 101. Such an embodiment would enable a user to view his/her adjustments as the content is moved into a desired position.

Figure 8:
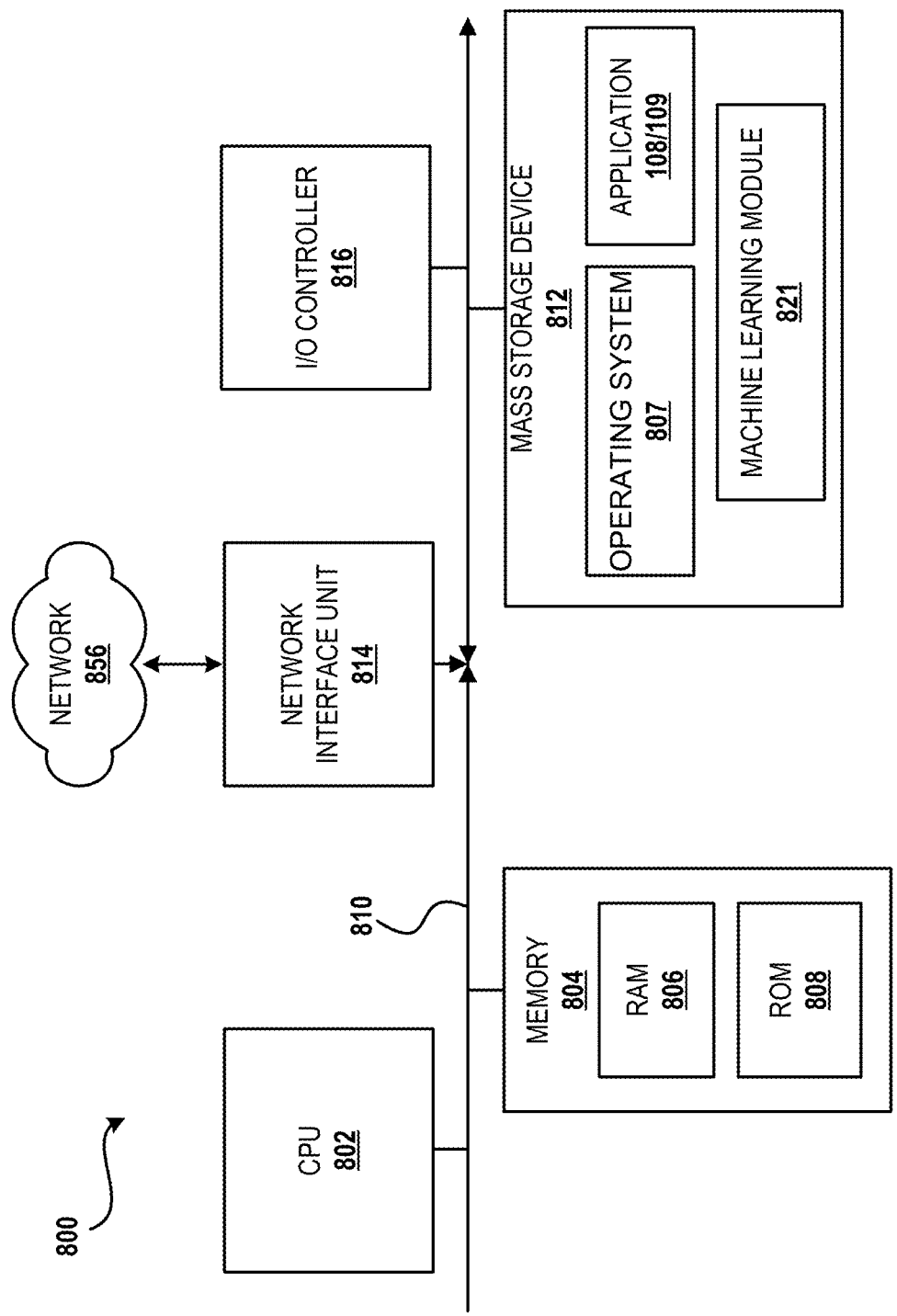
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing devices shown in FIG. 1A, capable of executing the program components described herein. Thus, the computer architecture 800 illustrated in FIG. 8 illustrates an architecture for a server computer, a mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, a machine learning module 807, one or more application programs, such as the applications 108 or 109 in FIG. 1A, and other data described herein.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 800. For purposes of the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 856 and/or another network (not shown in FIG. 8). The computer architecture 800 may connect to the network 856 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (also not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media.

These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
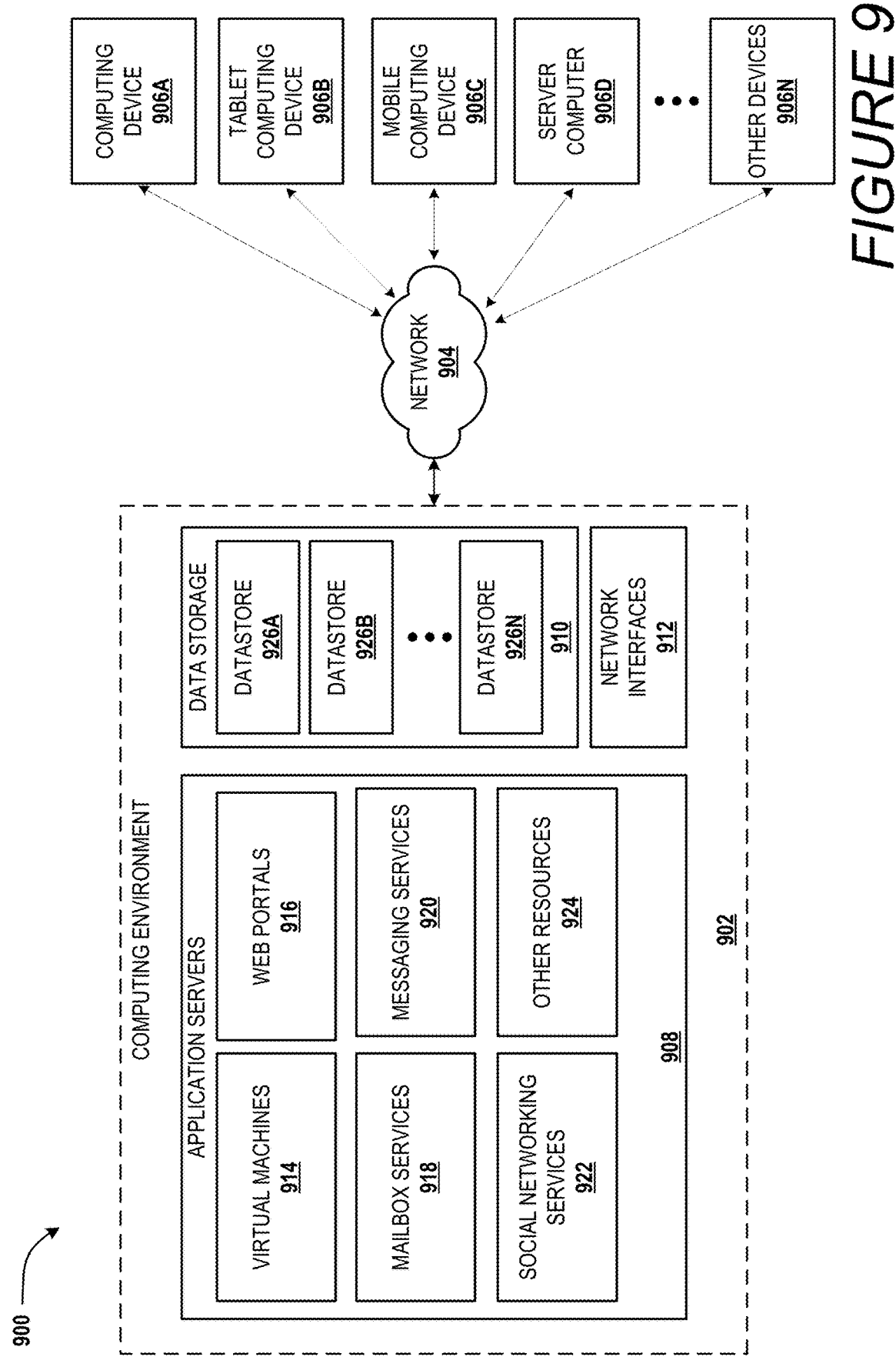
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

According to various implementations, the distributed computing environment 900 includes a computing environment 902 operating on, in communication with, or as part of the network 904. The network 904 may be or may include the network 856, described above with reference to FIG. 8. The network 904 also can include various access networks. One or more client devices 906A-906N (hereinafter referred to collectively and/or generically as "clients 906" and also referred to herein as computing devices 906) can communicate with the computing environment 902 via the network 904 and/or other connections (not illustrated in FIG. 9). In one illustrated configuration, the clients 906 can include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein. It should be understood that the illustrated clients 906 and computing architectures illustrated and described herein are illustrative and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for enabling aspects of the present disclosure. It should be understood that this configuration is illustrative and should not be construed as being limiting in any way. The application servers 908 also host or provide access to one or more portals, link pages, Web sites, and/or other information ("web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") and presence services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the TWITTER messaging service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein. For instance, any one of the application servers 908 may communicate or facilitate the functionality and features described herein. For instance, a social networking application, mail client, messaging client or a browser running on a phone or any other client 906 may communicate with a social networking service 922 and facilitate the functionality, even in part, described above with respect to FIG. 9. Any device or service depicted herein can be used as a resource for supplemental data, including email servers, storage servers, etc.

As shown in FIG. 9, the application servers 908 also can host other services, applications, portals, and/or other resources ("other resources") 924. The other resources 924 can include, but are not limited to, document sharing, rendering or any other functionality. It thus can be appreciated that the computing environment 902 can provide integration of the concepts and technologies disclosed herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store web page documents, word documents, presentation documents, data structures, algorithms for execution by a recommendation engine, and/or other data utilized by any application program or another module. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects. In one specific example, as summarized above, techniques described herein may be implemented, at least in part, by web browser application, which works in conjunction with the application servers 908 of FIG. 9.

Figure 10:
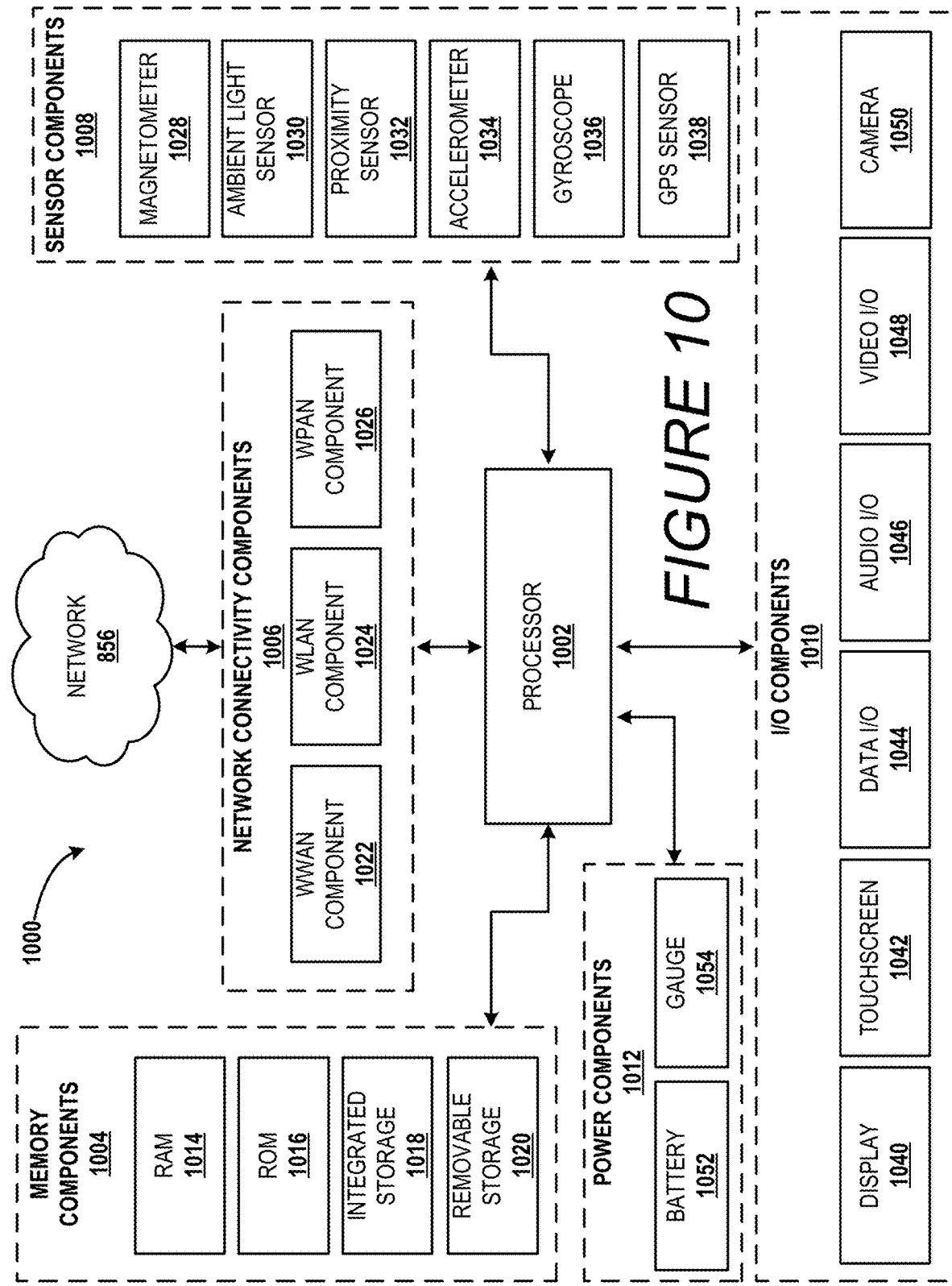
FIG. 10 is a computer architecture diagram illustrating another computing device architecture for a computing device capable of implementing aspects of the techniques and technologies presented herein.

Turning now to FIG. 10, an illustrative computing device architecture 1000 for a computing device that is capable of executing various software components described herein for enabling aspects of the present disclosure. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the computing devices shown in FIG. 1 and FIG. 9. Moreover, aspects of the computing device architecture 1000 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown in FIG. 10).

The processor 1002 includes a CPU configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1080P, and higher resolution), video games, 3D modeling applications, and the like. In some configurations, the processor 1002 is configured to communicate with a discrete GPU (also not shown in FIG. 10). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a RAM 1014, a ROM 1016, an integrated storage memory ("integrated storage") 1018, and a removable storage memory ("removable storage") 1020. In some configurations, the RAM 1014 or a portion thereof, the ROM 1016 or a portion thereof, and/or some combination of the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 856 or another network, which may be a WWAN, a WLAN, or a WPAN. Although only the network 856 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 1022 is configured to provide dual-multi-mode connectivity to the network 856. For example, the WWAN component 1022 may be configured to provide connectivity to the network 856, wherein the network 856 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems. The GPS sensor 1038 can also operate in conjunction with other components, such as the processor 1002, to generate positioning data for the computing device 1000.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

Figure 11:
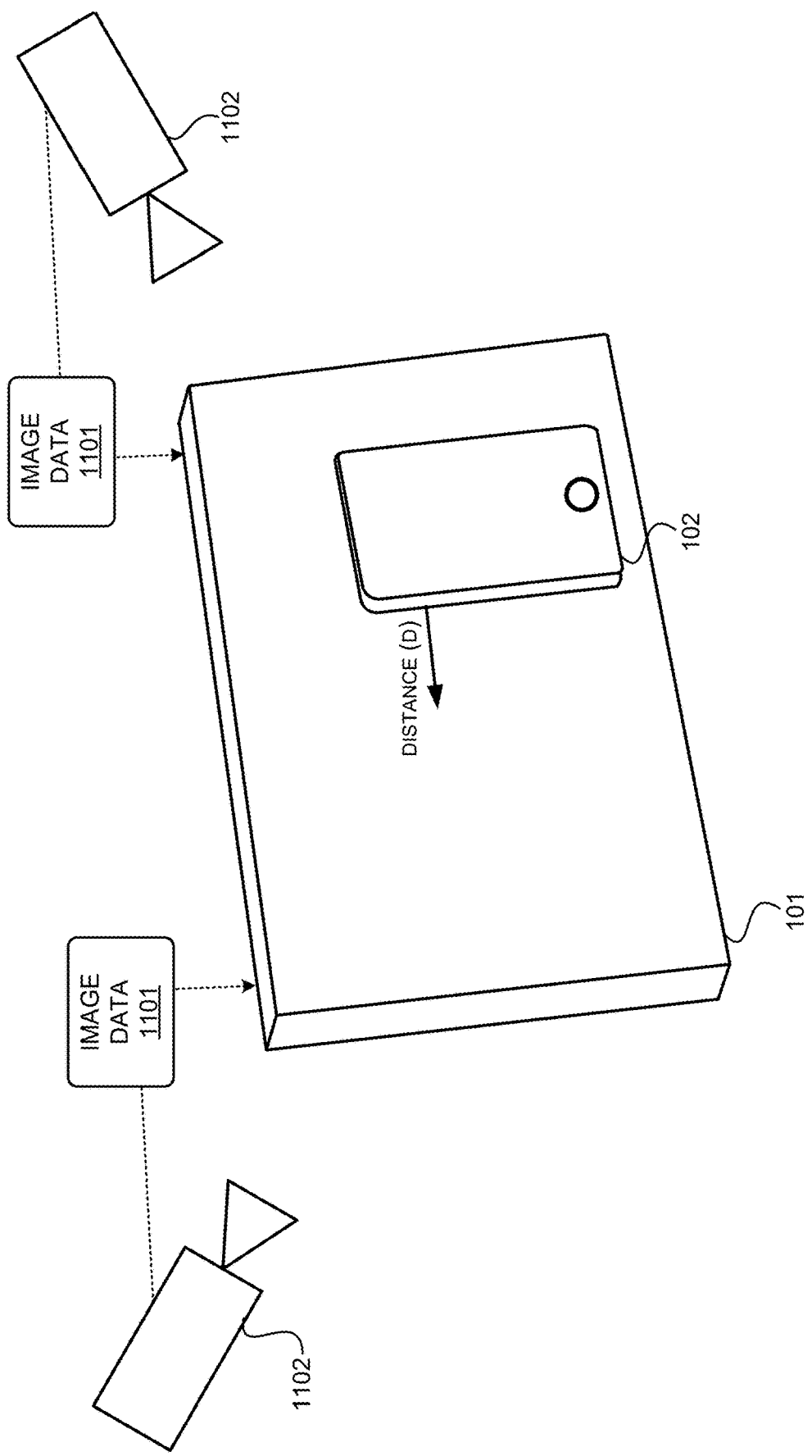
FIG. 11 illustrates an example configuration involving cameras that may be used to detect the position of a first computer relative to a second computer.

The alignment and position of the second computing device can be detected by the use of a number of different types of sensors. For example, RF sensors, optical proximity sensors, and location sensors (Wi-Fi, GPS, etc.) can be utilized. As shown in FIG. 11, one or more cameras 1102 directed towards the two computing devices (101 and 102) can also be utilized to determine an alignment and/or a distance between the two computers. The cameras housed in each computer can also be used to determine an alignment and a distance between the two computing devices. Image data 1101 can be communicated to, or generated by, at least one of the computers for analysis. Such an analysis can be used to generate coordinates, an offset, a distance (D) between the computers, and/or any other suitable data to determine a location, e.g., an anchor point, where the second content 106 is to be positioned relative to the first content 105. In some embodiments, cameras RF sensors, optical proximity sensors, location sensors, feedback sensors, vibration sensors, or any other suitable sensor can be used to determine when a user has tapped (i.e. touched) the second computer 102 to the display screen in communication with the first computer 101 to confirm the anchor point 120.

EXAMPLE CLAUSES

Example Clause A, a computer-implemented method comprising: displaying a first content of a first file on a display screen of a first computer executing a first environment for editing the first content; displaying a second content of a second file on a display screen of a second computer executing a second environment for editing the second content; receiving a signal from at least one sensor, the signal indicating a position of a display of the second content relative to a display of the first content; determining an anchor point within the first content based on the position of the display of the second content relative to the display of the first content; communicating the second content from the second computer to the first computer; and displaying a rendering of the second content concurrently with a rendering of the first content on the display screen of the first computer, wherein a position of the second content on the display screen of the first computer is based on the anchor point.

Example Clause B, the computer-implemented method of Example Clauses A and B, further comprising: communicating the first content from the first computer to the second computer; and displaying a portion of the first content on the display of the second computer to show an alignment between the first content and the second content, wherein a position of the first content on the display of the second computer is based on the anchor point.

Example Clause C, the computer-implemented method of any one of Example Clauses A through B, further comprising: receiving image data from a camera of the second computer, the camera for capturing images of the rendering of the first content on the display screen of the first computer; and rendering at least a portion of the image data on the display screen of the second computer to show an alignment between the first content and the second content.

Example Clause D, the computer-implemented method of Example Clauses A through C, wherein the rendering of the second content on the display screen of the first computer is based on a scaling factor, wherein the scaling factor is based on data received from a sensor indicating a distance between the second computer and the first computer.

Example Clause E, the computer-implemented method of Example Clauses A through D, wherein the rendering of the second content on the display screen of the first computer is based on a scaling factor, and wherein the method further comprises: displaying a user interface on a display screen of the second computer, the user interface configured to receive an input gesture; receiving the input gesture indicating a change in the scaling factor; and adjusting the scaling factor based on the input gesture.

Example Clause F, the computer-implemented method of Example Clauses A through E, wherein the rendering of the second content on the display screen of the first computer is based on a scaling factor, and wherein the scaling factor is based on at least one of a resolution of a screen of the second computer, a model of the second computer, or a user identifier.

Example Clause G, the computer-implemented method of Example Clauses A through F, further comprising: receiving a voice command at a sensor in communication with the first computer, the voice command describing a location for the second content to be placed within the first content; and interpreting the voice command to generate coordinates for the second content to be placed within the first content, wherein the rendering of at least one graphical element of the second content is based on the coordinates.

Example Clause H, the computer-implemented method of Example Clauses A through G, further comprising storing at least a portion of the second content within the first file, wherein the second content is stored with metadata defining the anchor point and at least one scaling factor applied to the second content.

Example Clause I, the computer-implemented method of Example Clauses A through H, further comprising: determining a blank area within the first content, the blank area created by an insertion of the second content; and generating additional content to accommodate any blank areas, wherein the additional content includes at least one graphical element that is an extension or a projection of at least one graphical element of the first content, wherein the rendering of the first content includes the at least one graphical element.

Example Clause J, a system comprising: one or more processing units; and a computer-readable medium having encoded thereon computer-executable instructions to cause the one or more processing units to display a first content of a first file on a display screen of a first computer executing a first environment for editing the first content; display a second content of a second file on a display screen of a second computer executing a second environment for editing the second content; receive a signal from at least one sensor, the signal indicating a position of a display of the second content relative to a display of the first content; determine an anchor point within the first content based on the position of the display of the second content relative to the display of the first content; communicate the second content from the second computer to the first computer; receive an input confirming the anchor point; and in response to the input confirming the anchor point, display a rendering of the second content concurrently with a rendering of the first content on the display screen of the first computer, wherein a position of the second content on the display screen of the first computer is based on the anchor point.

Example Clause K, the system of Example Clause J, wherein the input confirming the anchor point includes at least one of, receiving an input at a user interface element, receiving a signal indicating that the second computer contacted the first computer, a voice command confirming the location, or a voice command indicating the anchor point.

Example Clause L, the system of any one of Example Clauses J though K, where the computer-executable instructions further cause the one or more processing units to: communicate text properties or the drawing properties from the second computer to the first computer; and apply the text properties or the drawing properties to the second content displayed on the display screen.

Example Clause M, the system of any one of Example Clauses J though L, wherein the first content on the display screen is modified to adopt the text properties or the drawing properties.

Example Clause N, the system of any one of Example Clauses J though M, where the computer-executable instructions further cause the one or more processing units to: determine that a blank area within the first content is created by an insertion of the second content; and generate additional content to fill the blank area, wherein the additional content includes at least one graphical element that is an extension or a projection of at least one graphical element of the first content, wherein the rendering of the first content includes the at least one graphical element, and wherein the extension or the projection of the at least one graphical element is generated by a machine learning module employing one or more machine learning mechanisms.

Example Clause O, a computer-implemented method comprising, displaying a first content of a first file on a display screen of a first computer executing a first environment for editing the first content; displaying a second content of a second file on a display screen of a second computer executing a second environment for editing the second content; receiving an input gesture defining a region within the first content, wherein data defining the region allows an insertion of the second content within the region, wherein the data defining the region restricts the insertion of the second content outside of the region; analyzing an input signal to determine a position of the second content; and in response to determining that the position of the second content is within the region, communicating the second content from the second computer to the first computer and displaying the second content on the display screen of the first computer within the region.

Example Clause P, the computer-implemented method of Example Clause O, further comprising in response to determining that the position of the second content is outside of the region, preventing the communication of the second content from the second computer to the first computer and preventing the display of the second content on the display screen of the first computer.

Example Clause Q, the computer-implemented method of any one of Example Clauses O through P, wherein the input signal includes at least one of a voice input indicating the position of the second content or a signal from a sensor indicating a location of the second computer relative to the first computer, the location indicating the position of the second content.

Example Clause R, the computer-implemented method of any one of Example Clauses O through Q, wherein the input gesture defining the region comprises an ink gesture, and wherein the method further comprises analyzing the ink gesture to determine the region.

Example Clause S, the computer-implemented method of any one of Example Clauses O through R, wherein the input gesture indicates an identifier, wherein the method further comprises: determining that the identifier is associated with the second content; and in response to determining that the identifier is associated with the second content, allowing communication of the second content from the second computer to the first computer and allowing the display of the second content on the display screen of the first computer within the region.

Example Clause T, the computer-implemented method of any one of Example Clauses O through S, in response to determining that the identifier is not associated with the second content, preventing the communication of the second content from the second computer to the first computer and preventing the display of the second content on the display screen of the first computer.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

The invention claimed is:

1. A method for merging content on a first computer from a second computer comprising:
   displaying a first content of a first file on a display screen of the first computer executing a first environment for editing the first content;
   displaying a second content of a second the on a display screen of the second computer executing a second environment for editing the second content;
   receiving a signal from at least one sensor, the signal indicating a position of a display of the second content relative to a display of the first content;
   determining an anchor point within the first content based on the position of the display of the second content relative to the display of the first content;
   determining a scaling factor based on one or more user preferences associated with a user identity;
   communicating the second content from the second computer to the first computer; and
   displaying a rendering of the second content concurrently with a rendering of the first content on the display screen of the first computer, wherein a position of the second content on the display screen of the first computer is based on the anchor point, wherein the rendering of the second content that is displayed concurrently with the first content on the display screen of the first computer is communicated from the second computer in response to a request to merge the second content with the first content at the anchor point, wherein the rendering of the second content is displayed based on the scaling factor that is determined based on the one or more user preferences associated with the second computer and adjusted based on data received from the at least one sensor indicating a distance between the second computer and the display screen of the first computer.

2. The method of claim 1, further comprising:
   communicating the first content from the first computer to the second computer; and
   displaying a portion of the first content on the display of the second computer to show an alignment between the first content and the second content, wherein a position of the first content on the display of the second computer is based on the anchor point.

3. The method of claim 1, further comprising:
receiving image data from a camera of the second computer, the camera for capturing images of the rendering of the first content on the display screen of the first computer; and
rendering at least a portion of the image data on the display screen of the second computer to show an alignment between the first content and the second content.

4. The method of claim 1, wherein the rendering of the second content on the display screen of the first computer is based on a scaling factor, and wherein the scaling factor is based on at least one of a resolution of a screen of the second computer, a model of the second computer, or a user identifier.

5. The method of claim 1, further comprising:
receiving a voice command at a sensor in communication with the first computer, the voice command describing a location for the second content to be placed within the first content; and
interpreting the voice command to generate coordinates for the second content to be placed within the first content, wherein the rendering of at least one graphical element of the second content is based on the coordinates.

6. The method of claim 1, further comprising storing at least a portion of the second content within the first file, wherein the second content is stored with metadata defining the anchor point and at least one scaling factor applied to the second content.

7. The method of claim 1, further comprising:
determining a blank area within the first content, the blank area created by an insertion of the second content; and
generating additional content to accommodate any blank areas, wherein the additional content includes at least one graphical element that is an extension or a projection of at least one graphical element of the first content, wherein the rendering of the first content includes the at least one graphical element.

8. The method of claim 1, wherein the first content originally stored on the first computer is not scaled while the second content communicated from the second computer content displayed on the display screen of the first computer is scaled according to the distance between the second computer and the display screen of the first computer.

9. The method of claim 1, wherein the scaling factor is further adjusted in response to a user input comprising at least one of a stored user preference, a gesture, a voice command, and an input via a user interface.

10. The method of claim 1, wherein the scaling factor is further determined based on a model number of the second computer.

11. A system for merging content on a first computer from a second computer comprising:
one or more processing units; and
a computer-readable medium having encoded thereon computer-executable instructions to cause the one or more processing units to
display a first content of a first the on a display screen of the first computer executing a first environment for editing the first content;
display a second content of a second the on a display screen of the second computer executing a second environment for editing the second content;
receive a signal from at least one sensor, the signal indicating a position of a display of the second content relative to a display of the first content;
determine an anchor point within the first content based on the position of the display of the second content relative to the display of the first content;
determine a scaling factor based on one or more user preferences associated with a user identity;
communicate the second content from the second computer to the first computer;
receive an input confirming the anchor point; and
in response to the input confirming the anchor point, display a rendering of the second content concurrently with a rendering of the first content on the display screen of the first computer, wherein a position of the second content on the display screen of the first computer is based on the anchor point, wherein the rendering of the second content that is displayed concurrently with the first content on the display screen of the first computer is communicated from the second computer in response to a request to merge the second content with the first content at the anchor point, wherein the rendering of the second content is displayed based on the scaling factor that is determined based on the one or more user preferences associated with the second computer and adjusted based on data received from the at least one sensor indicating a distance between the second computer and the display screen of the first computer.

12. The system of claim 11, wherein the input confirming the anchor point includes at least one of, receiving an input at a user interface element, receiving a signal indicating that the second computer contacted the first computer, a voice command confirming the location, or a voice command indicating the anchor point.

13. The system of claim 11, where the computer-executable instructions further cause the one or more processing units to:
communicate text properties or drawing properties from the second computer to the first computer; and
apply the text properties or the drawing properties to the second content displayed on the display screen.

14. The system of claim 11, where the computer-executable instructions further cause the one or more processing units to:
determine that a blank area within the first content is created by an insertion of the second content; and
generate additional content to fill the blank area, wherein the additional content includes at least one graphical element that is an extension or a projection of at least one graphical element of the first content, wherein the rendering of the first content includes the at least one graphical element, and wherein the extension or the projection of the at least one graphical element is generated by a machine learning module employing one or more machine learning mechanisms.

15. A method for merging content on a first computer from a second computer comprising,
displaying a first content of a first file on a display screen of the first computer executing a first environment for editing the first content;
displaying a second content of a second file on a display screen of the second computer executing a second environment for editing the second content;
receiving an input gesture defining a region within the first content, wherein data defining the region allows an insertion of the second content within the region, wherein the data defining the region restricts the insertion of the second content outside of the region;

determining a scaling factor based on one or more user preferences associated with a user identity;

analyzing an input signal to determine a position of the second content; and in response to determining that the position of the second content is within the region, communicating the second content from the second computer to the first computer and displaying the second content on the display screen of the first computer within the region, wherein the rendering of the second content that is displayed concurrently with the first content on the display screen of the first computer is communicated from the second computer in response to a request to merge the second content with the first content at the anchor point, wherein the rendering of the second content is displayed based on the scaling factor that is determined based on the one or more user preferences associated with the second computer and adjusted based on data received from the at least one sensor indicating a distance between the second computer and the display screen of the first computer.

16. The method of claim 15, further comprising in response to determining that the position of the second content is outside of the region, preventing the communication of the second content from the second computer to the first computer and preventing the display of the second content on the display screen of the first computer.

17. The method of claim 15, wherein the input signal includes at least one of a voice input indicating the position of the second content or a signal from a sensor indicating a location of the second computer relative to the first computer, the location indicating the position of the second content.

18. The method of claim 15, wherein the input gesture defining the region comprises an ink gesture, and wherein the method further comprises analyzing the ink gesture to determine the region.

19. The method of claim 15, wherein the input gesture indicates an identifier, wherein the method further comprises:

determining that the identifier is associated with the second content; and in response to determining that the identifier is associated with the second content, allowing communication of the second content from the second computer to the first computer and allowing the display of the second content on the display screen of the first computer within the region.

20. The method of claim 19, in response to determining that the identifier is not associated with the second content, preventing the communication of the second content from the second computer to the first computer and preventing the display of the second content on the display screen of the first computer.

* * * * *